(12) United States Patent
Bae

(10) Patent No.: US 11,330,479 B2
(45) Date of Patent: May 10, 2022

(54) METHOD FOR SUPPORTING DATA FORWARDING DURING CONDITIONAL HANDOVER AND DUAL STACK PROTOCOL HANDOVER IN NEXT-GENERATION MOBILE COMMUNICATION SYSTEM

(71) Applicant: Samsung Electronics Co., Ltd., Suwon-si (KR)

(72) Inventor: Beomsik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/156,471

(22) Filed: Jan. 22, 2021

(65) Prior Publication Data

US 2021/0227428 A1 Jul. 22, 2021

(30) Foreign Application Priority Data

Jan. 22, 2020 (KR) ........................ 10-2020-0008860

(51) Int. Cl.
*H04W 36/00* (2009.01)
*H04W 28/06* (2009.01)

(52) U.S. Cl.
CPC ....... *H04W 36/0033* (2013.01); *H04W 28/06* (2013.01); *H04W 36/0069* (2018.08); *H04W 36/00837* (2018.08)

(58) Field of Classification Search
CPC ............. H04W 36/0033; H04W 28/06; H04W 36/0069; H04W 36/00837; H04W 36/02;
(Continued)

(56) References Cited

U.S. PATENT DOCUMENTS 9,155,014 B2 10/2015 Tenny et al.
10,264,501 B2 4/2019 Shi et al.
(Continued)

FOREIGN PATENT DOCUMENTS

CN 105409285 B 11/2019
KR 10-1298920 B1 8/2013
(Continued)

OTHER PUBLICATIONS

Huawei, "DAPS HO in split gNB", 3GPP TSG-RAN WG3 #106, Nov. 18-22, 2019, R3-196897, 5 pages.
(Continued)

*Primary Examiner* — Ahmed Elallam

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. According to the disclosure, it is possible to efficiently support data forwarding during conditional handover and dual stack protocol handover.

14 Claims, 20 Drawing Sheets

(58) Field of Classification Search
CPC . H04W 36/36; H04W 92/04; H04W 36/0016; H04W 36/08; H04W 92/20
See application file for complete search history.

(56) References Cited

U.S. PATENT DOCUMENTS

| | | | |
|---|---|---|---|
| 10,932,168 B2* | 2/2021 | Yang | H04W 36/0033 |
| 11,190,989 B2* | 11/2021 | Sirotkin | H04W 36/0033 |
| 2019/0223057 A1 | 7/2019 | Park et al. | |
| 2019/0342800 A1* | 11/2019 | Sirotkin | H04B 17/318 |
| 2020/0077314 A1 | 3/2020 | Hwang et al. | |
| 2021/0185755 A1* | 6/2021 | Kim | H04W 68/005 |
| 2021/0274529 A1* | 9/2021 | Chen | H04W 28/0268 |
| 2021/0306848 A1* | 9/2021 | Chen | H04W 76/18 |

FOREIGN PATENT DOCUMENTS

| | | |
|---|---|---|
| KR | 10-2018-0122963 A | 11/2018 |
| KR | 10-2019-0087299 A | 7/2019 |

OTHER PUBLICATIONS

ETRI, "Remaining FFSs on Data Forwarding for DAPS HO and CHO", 3GPP TSG-RAN WG2 Meeting #108, Nov. 18-22, 2019, R2-1915039, 5 pages.

"3rd Generation Partnership Project; Technical Specification Group Radio Access Network; NG-RAN; E1 Application Protocol (E1AP)(Release 15)", 3GPP TS 38.463 V15.6.0 (Sep. 2019), 176 pages.

CATT, "CR to TS 38.401 for E1 impact during DAPS Handover", Change Request, 3GPP TSG-RAN WG3 #106, Nov. 18-22, 2019, R3-196723, 6 pages.

International Search Report dated Apr. 19, 2021 in connection with International Patent Application No. PCT/KR2021/000915, 3 pages.

Written Opinion of the International Searching Authority dated Apr. 19, 2021 in connection with International Patent Application No. PCT/KR2021/000915, 4 pages.

* cited by examiner

FIG. 4A

DRB To Modify List IE

| IE/Group Name | Presence | Range | IE type and reference | Semantics description |
|---|---|---|---|---|
| DRB To Modify Item | | 1..<maxnoof DRBs> | | |
| >DRB ID | M | | | Data Radio Bearer ID |
| >PDCP SN Status Request | O | | ENUMERATED (requested,...) | The gNB-CU-CP requests the gNB-CU-UP to provide the PDCP SN Status in the response message. |
| >PDCP SN Status Information | O | | [...] | Providing SN Status Information to the target gNB-CU-UP |
| >Early Data Forwarding Request | O | | ENUMERATED (requested,...) | |
| >Early Data Forwarding Information List | | 0..<maxnoof CellsinCHO> | | |
| >Early Data Forwarding Information | M | | UP Transport Layer Information | UP Transport Layer Information is the GTP Tunnel Information which consists of the Transport Layer Address IE and the GTP-TEID IE |
| >First PDCP DL COUNT Request | O | | ENUMERATED (requested,...) | |
| >First PDCP DL COUNT Information | O | | | PDCP-SN and Hyper frame number of the first DL SDU that the source RAN node forwards to the target RAN node |
| >PDCP DL Discarding Information Request | O | | ENUMERATED (requested,...) | |
| >PDCP DL Discarding Information | O | | | PDCP-SN and Hyper frame number for which the target RAN node should discard forwarded DL SDUs |

(a) IE information including BEARER CONTEXT MODIFICATION REQUEST message

FIG. 4B

DRB Modified List IE

| IE/Group Name | Presence | Range | IE type and reference | Semantics description |
|---|---|---|---|---|
| DRB To Modify Item | | 1..<maxnoof DRBs> | | |
| >DRB ID | M | | | Data Radio Bearer ID |
| >PDCP SN Status Information | O | | [...] | Provides the PDCP SN Status from the source gNB-CU-UP. |
| >First PDCP DL COUNT Information | O | | [...] | PDCP-SN and Hyper frame number of the first DL SDU that the source RAN node forwards to the target RAN node |
| >PDCP DL Discarding Information | O | | | PDCP-SN and Hyper frame number for which the target RAN node should discard forwarded DL SDUs |

(b) IE information including BEARER CONTEXT MODIFICATION RESPONSE message or BEARER CONTEXT MODIFICATION REQUIRED message

FIG. 5A

BEARER CONTEXT MODIFICATION REQUEST Message

| IE/Group Name | Presence | Range | IE type and reference | Semantics description | Criticality | Assigned Criticality |
|---|---|---|---|---|---|---|
| Message Type | M | | [...] | Message Type | Yes | reject |
| CHO Trigger | O | | ENUMERATED (CHO-initiation, CHO-replace,...) | Indicates CHO is initiated or replaces. | YES | ignore |
| DAPS Indicator | O | | ENUMERATED (DAPS required,...) | Indicates DAPS HO is requested | YES | ignore |

(a) IE information including BEARER CONTEXT MODIFICATION REQUEST message

FIG. 5B

BEARER CONTEXT MODIFICATION REQUIRED Message

| IE/Group Name | Presence | Range | IE type and reference | Semantics description | Criticality | Assigned Criticality |
|---|---|---|---|---|---|---|
| Message Type | M | | | Message Type | Yes | reject |
| Early Data Forwarding Triggered Indication | O | | ENUMERATED (triggered, ...) | Indicates early data forwarding is triggered. | YES | ignore |

(b) IE information including BEARER CONTEXT MODIFICATION REQUIRED message

FIG. 5C

DRB Required To Modify List IE

| IE/Group Name | Presence | Range | IE type and reference | Semantics description |
|---|---|---|---|---|
| DRB Required To Modify Item | | 1..<maxnoof DRBs> | | |
| >DRB ID | M | | | Data Radio Bearer ID |
| | | | [...] | |
| >Early Data Forwarding Triggered Indication | O | | ENUMERATED (triggered,...) | Indicates early data forwarding is triggered. |

(c) IE information including BEARER CONTEXT MODIFICATION REQUIRED message

FIG. 9

HANDOVER REQUEST ACKNOWLEDGE

| IE/Group Name | Presence | Range | IE type and reference | Semantics description | Criticality | Assigned Criticality |
|---|---|---|---|---|---|---|
| Message Type | M | | | Message Type | Yes | reject |
| Data Forwarding Info Reused Indication | O | | ENUMERATED (reused,...) | | YES | ignore |
| [...] | | | | | | |

METHOD FOR SUPPORTING DATA FORWARDING DURING CONDITIONAL HANDOVER AND DUAL STACK PROTOCOL HANDOVER IN NEXT-GENERATION MOBILE COMMUNICATION SYSTEM

CROSS-REFERENCE TO RELATED APPLICATION

This application is based on and claims priority under 35 U.S.C. § 119 to Korean Patent Application No. 10-2020-0008860 filed on Jan. 22, 2020 in the Korean Intellectual Property Office, the disclosure of which is herein incorporated by reference in its entirety.

BACKGROUND

1. Field

The disclosure relates to an operation of a base station in a mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Disclosed embodiments provide a signaling method and a base station node processing method for supporting effective data forwarding, when data forwarding between base stations is performed to effectively support conditional handover (CHO) and dual stack protocol handover (DAPS handover) introduced to improve handover performance in a mobile communication system.

According to one embodiment of the disclosure, a method of performed by a first base station in a wireless communication system may include: delivering, from a centralized unit-control plane (CU-CP) to a centralized unit-user plane (CU-UP), a first message for a bearer context modification request during a specific handover procedure, the first message including information on an early forwarding count request, delivering, from the CU-UP to the CU-CP, a second message for a bearer context modification response, the second message including information on a first downlink (DL) count and transmitting, from the CU-CP to a second base station, a third message including the information on the first DL count.

According to another embodiment of the disclosure, a first base station in a wireless communication system may include: a transceiver and at least one processor configured to deliver, from a centralized unit-control plane (CU-CP) to a centralized unit-user plane (CU-UP), a first message for a bearer context modification request during a specific handover procedure, the first message including information on an early forwarding count request, deliver, from the CU-UP to the CU-CP, a second message for a bearer context modification response, the second message including information on a first downlink (DL) count, and control the transceiver to transmit, from the CU-CP to a second base station, a third message including the information on the first DL count.

According to the disclosure, it is possible to effectively support data forwarding during conditional handover and dual stack protocol handover.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4A-4B is diagrams illustrating examples of a configuration of a signaling message exchanged between a CU-CP and a CU-UP, when performing conditional handover (CHO) or dual active protocol stack handover (DAPS HO) between RAN nodes, each of which is divided into the CU-CP and the CU-UP;

FIG. 5A-5C is diagrams illustrating examples of a configuration of a signaling message exchanged between a CU-CP and a CU-UP, in a case of determining whether to perform early data forwarding in a CU-UP of a source RAN node, so as to support the early data forwarding, when performing conditional handover (CHO) or dual active protocol stack handover (DAPS HO) between RAN nodes, each of which is divided into the CU-CP and the CU-UP;

FIG. 9 is a diagram illustrating an example of a configuration of a signaling message exchanged between a source RAN node and a target RAN node in order to efficiently perform early data forwarding, when conditional handover is configured for multiple target cells of the single target RAN node;

DETAILED DESCRIPTION

Figure 1:
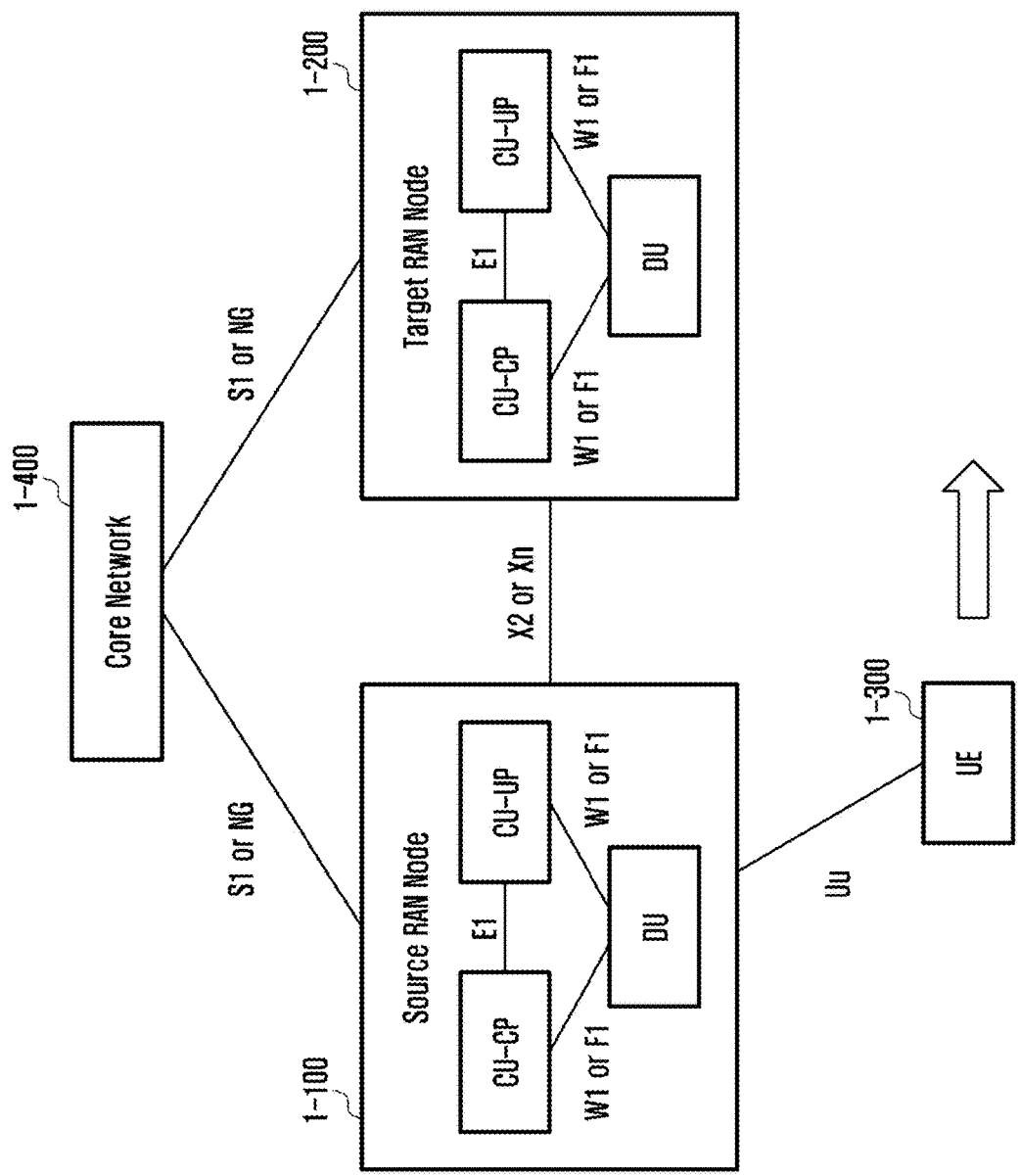
FIG. 1 is a diagram illustrating an example of an applicable structure of a next-generation mobile communication system.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure uses terms and names defined in the standards of 5G, NR, or LTE systems for the convenience of description. However, the disclosure is not limited by these terms and names, and may be applied in the same way to systems that conform other standards.

That is, a detailed description of embodiments of the disclosure will be directed to communication standards defined by 3GPP, but based on determinations by those skilled in the art, the main idea of the disclosure may be applied to other communication systems having similar technical backgrounds through some modifications without significantly departing from the scope of the disclosure.

FIG. 1 is a diagram illustrating an example of a structure of a next-generation mobile communication system to which the technology of the disclosure is applicable. Radio access network (RAN) nodes 1-100 and 1-200 specified in the structure may be a mobile communication base station, such as an LTE eNB and NR gNB which are connected to a mobile communication core network (CN), such as an evolved packet core (EPC) or 5G core network (5GC) 1-400. The RAN nodes 1-100 and 1-200 may be divided into a centralized unit (CU) and a distributed unit (DU), wherein the CU is further divided into a control plane (CU-CP) and a user plane (CU-UP). Each of the RAN nodes may include one or more CU-CPs, one or more CU-UPs, and one or more DUs. The CU-CPs, CU-UPs, and DUs constituting one RAN node may be configured together. For example, a CU and a DU, in which a CU-CP and a CU-UP are implemented together, may be included in one RAN node; a CU-CP and a DU may be implemented together while a CU-UP is separately configured, in another RAN node; another RAN node may be configured in the form of an integrated base station in which a CU-CP, a CU-UP, and a DU are implemented together; and a RAN node may be configured by other combinations. A CU and a DU separately support each function of a base station. For example, the CU may support an RRC/PDCP layer, and the DU may support an RLC/MAC/PHY/RF layer. The CU and the DU may be connected via an interface between base station internal functions, such as interface W1 or interface F1. The CU may be further divided into a CU-CP and a CU-UP. For example, the CU-CP may support an RRC/PDCP (for RRC) layer, and the CU-UP may support a PDCP (for user data transmission) layer. The CU-CP and the CU-UP may be connected via an interface between base station internal functions, such as interface E1. Here, base stations are made in an integrated structure or a separate-type structure, and a connection between integrated structure base stations, a connection between separate-type base stations, and a connection between an integrated structure base station and a separate structure base station may be possible. The RAN nodes may be connected via an inter-base station interface, such as interface X2 or interface Xn. The RAN nodes may be connected to a core network via an inter base station-core network interface, such as interface Si or interface NG. The technology provided in the disclosure is operable when a terminal 1-300 performs handover between base stations when moving to a target RAN node while connected to a source RAN node, regardless of an integrated base station or a separate-type base station.

Figure 2A:
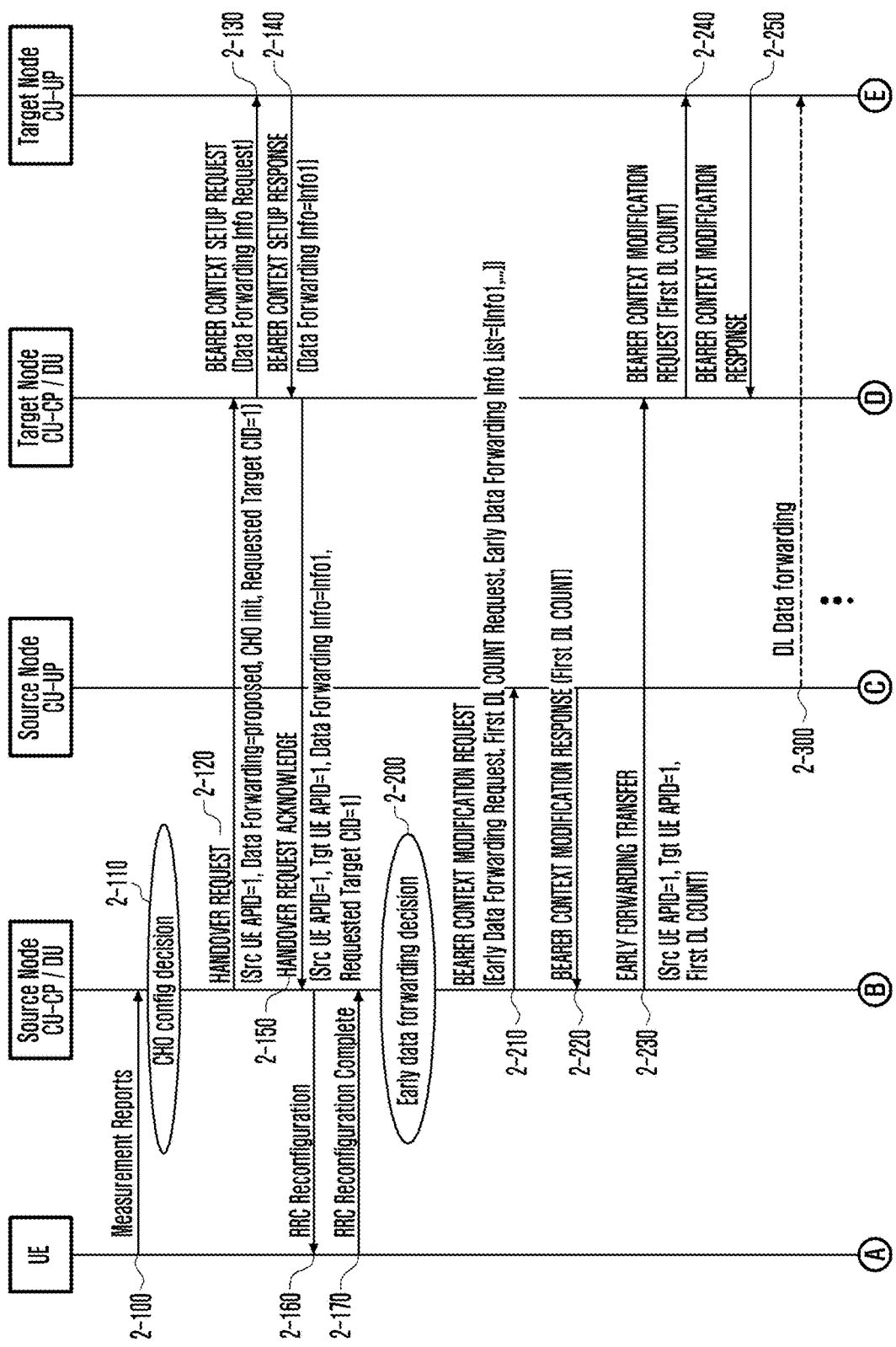
FIG. 2A-2C is a diagram illustrating an embodiment of, when performing conditional handover (CHO) or dual active protocol stack handover (DAPS HO) between RAN nodes, each of which is divided into a CU-CP and a CU-UP, determining whether to perform early data forwarding in a CU-CP of a source RAN node, so as to support the early data forwarding.
Figure 2B:
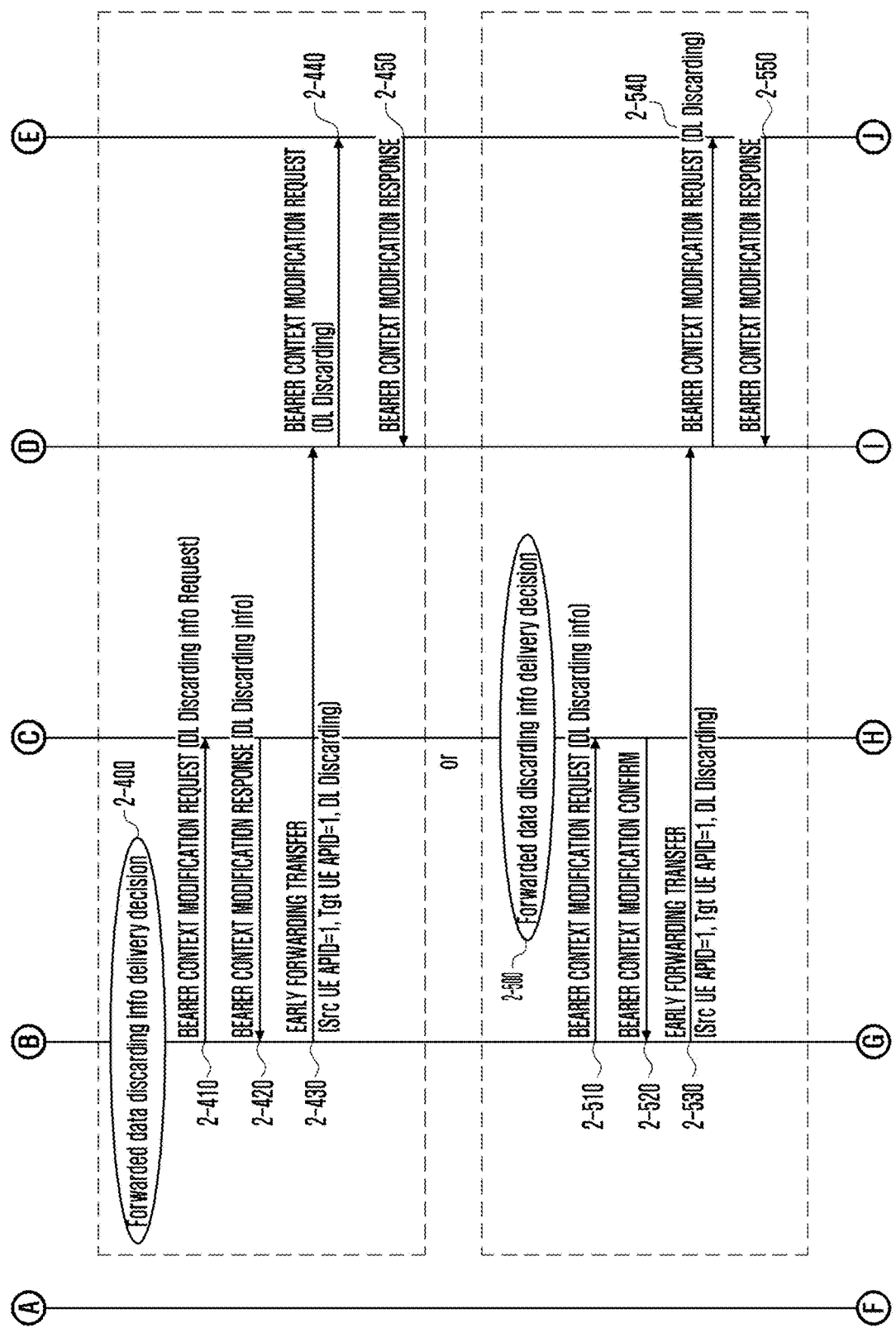
Figure 2C:
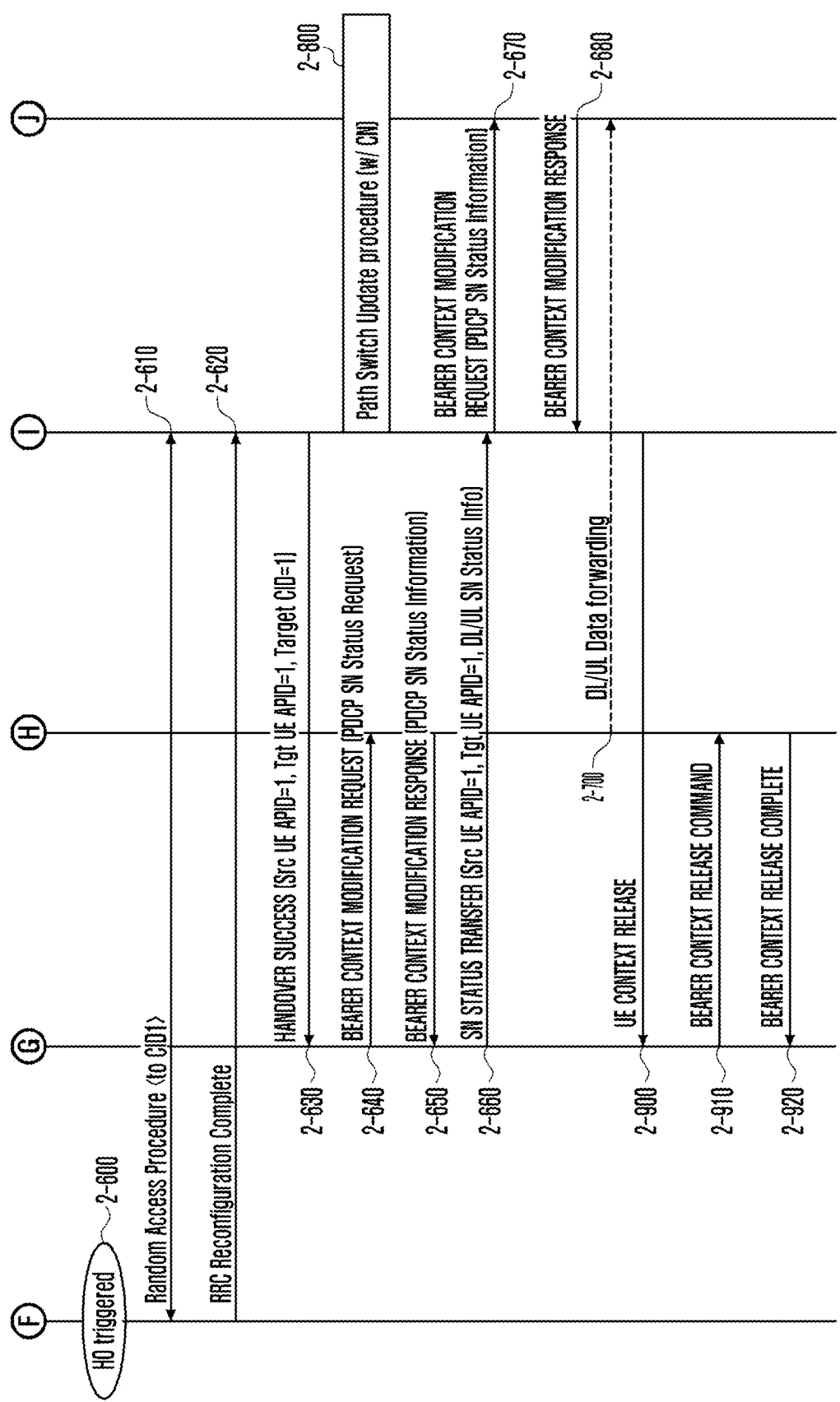
Figure 3A:
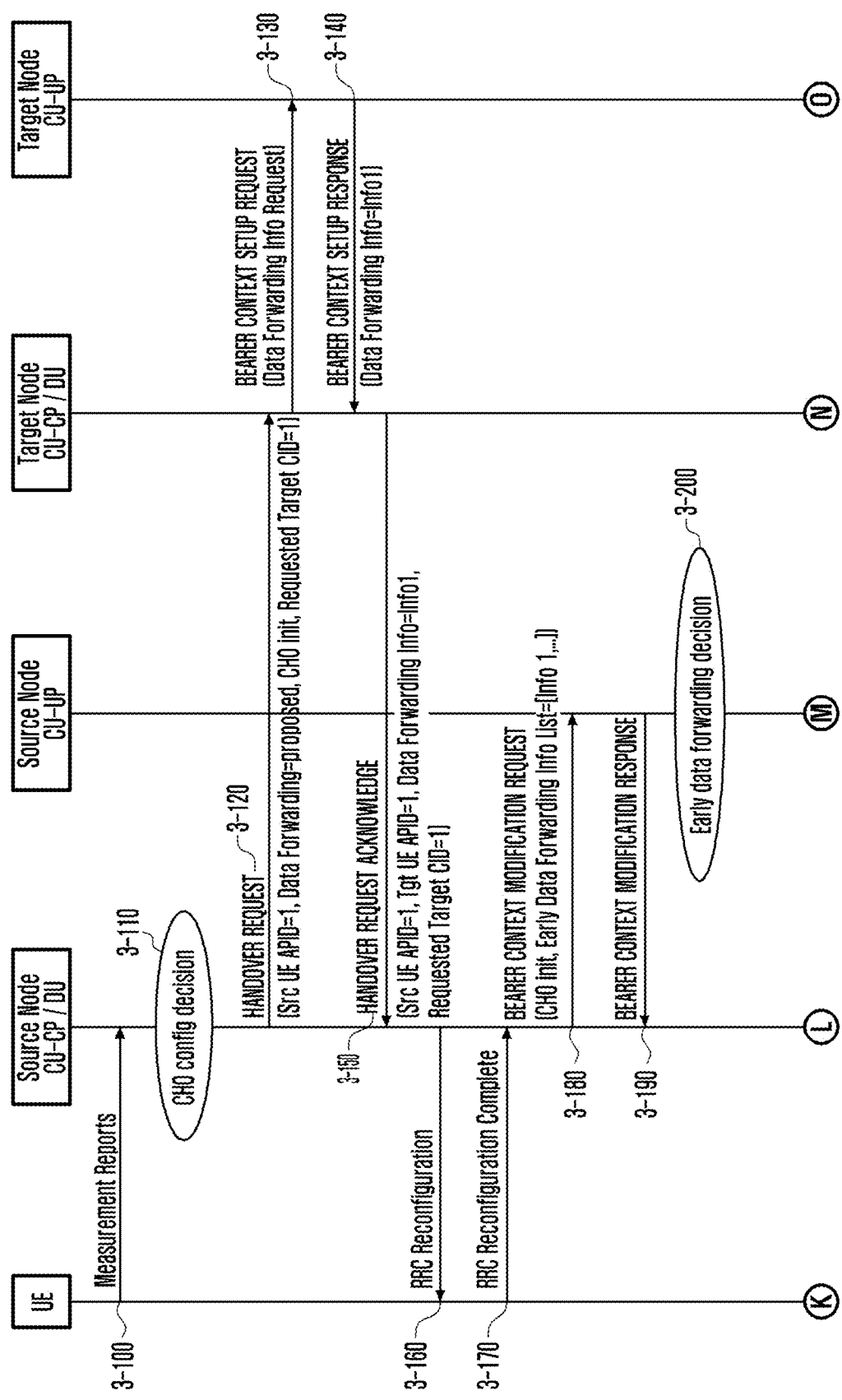
FIG. 3A-3C is a diagram illustrating an embodiment of, when performing conditional handover (CHO) or dual active protocol stack handover (DAPS HO) between RAN nodes, each of which is divided into a CU-CP and a CU-UP, determining whether to perform early data forwarding in a CU-UP of a source RAN node, so as to support the early data forwarding.
Figure 3B:
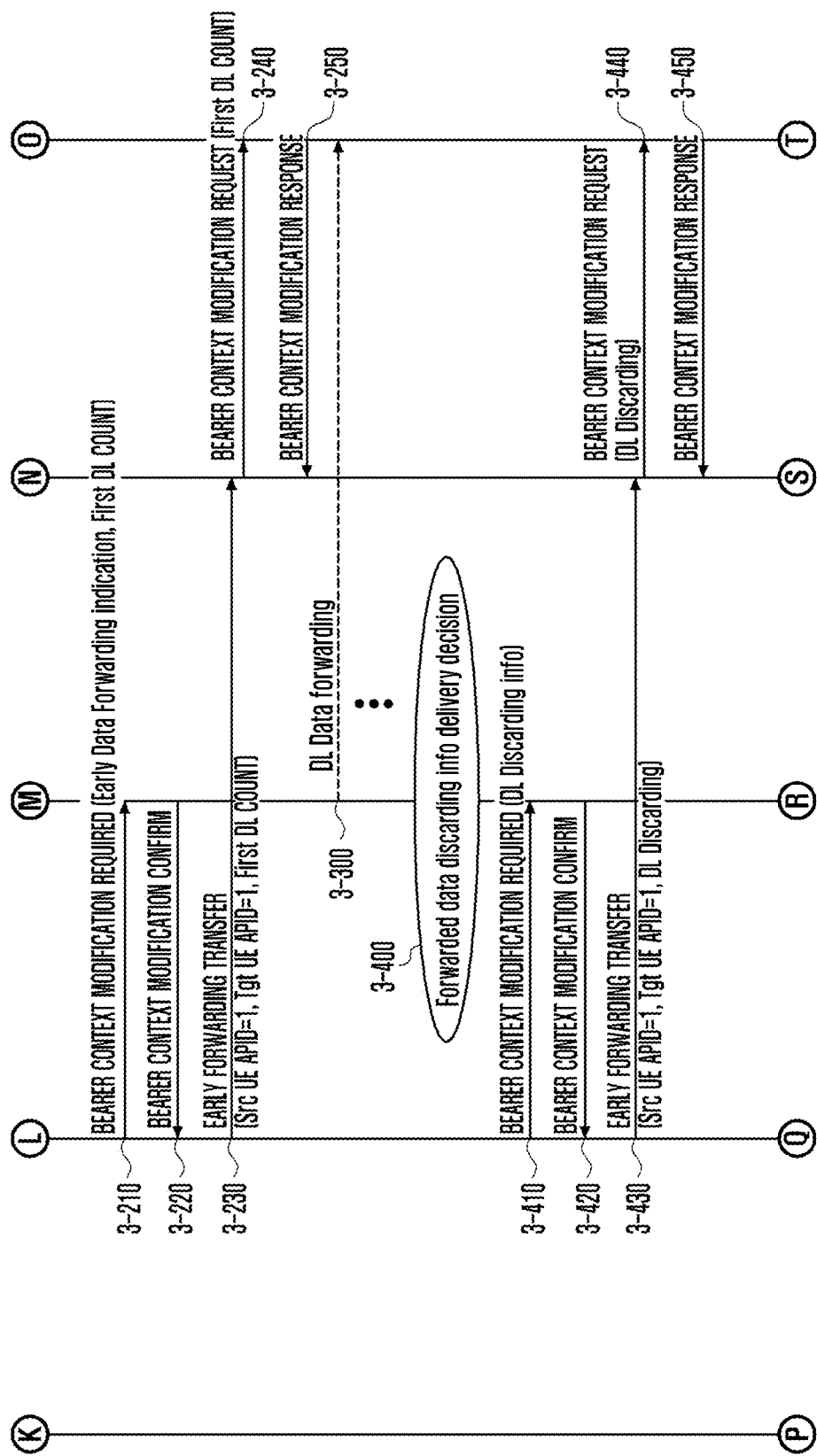
Figure 3C:
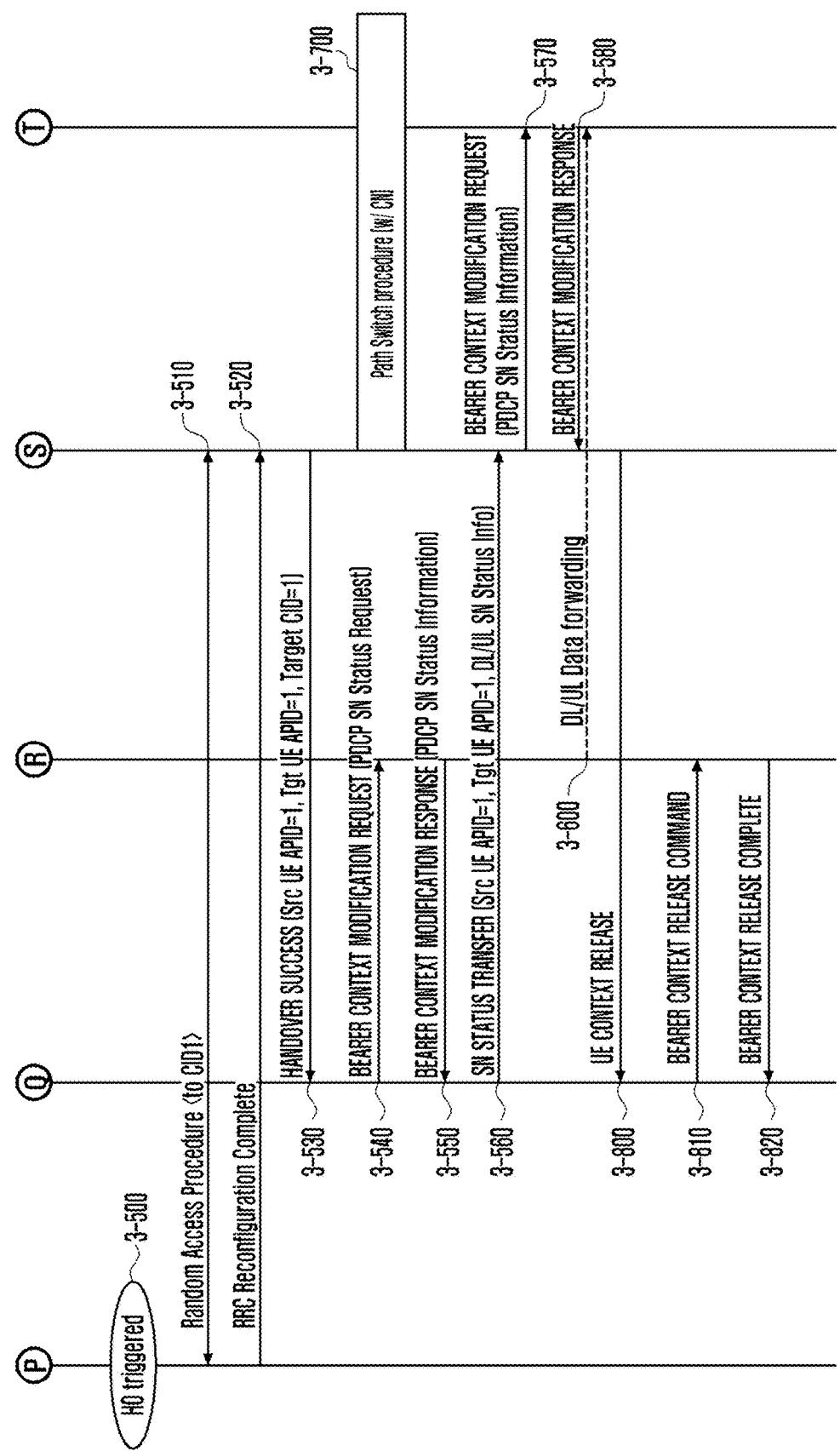

FIG. 2 and FIG. 3 show various embodiments for supporting early data forwarding, when a terminal performs conditional handover (CHO) or dual stack protocol handover (DAPS handover) between RAN nodes, each of which is divided into a CU-CP and a CU-UP. Early data forwarding is a method of, before a terminal accesses a target RAN node to perform handover, transferring (data forwarding) data, which is stored, in a source RAN node, for a service of the terminal, to the target RAN node. In FIG. 2 and FIG. 3, a RAN node may be divided into a CU-CP, a CU-UP, and a DU, and FIG. 2 and FIG. 3 show an example in which a CU-CP and a DU are configured to be one entity. However, the CU-CP and the DU may be further divided, and whether the CU-CP and the DU are integrated or separated may operate regardless of the content of the disclosure. FIG. 2 and FIG. 3 include an embodiment of a case where conditional handover (CHO) is used, but the content included in the disclosure may be applied to a case where dual protocol stack handover (DAPS HO) is used.

Specifically, FIG. 2 shows an embodiment of a case in which a CU-CP of a source RAN node determines whether to perform early data forwarding, and supports early data forwarding. When the CU-CP receives a measurement report transmitted by a terminal (UE) in operation 2-100 of FIG. 2 via a DU of the source RAN node, the source RAN node may determine to perform conditional handover (CHO) and may determine a potential target RAN node, as in operation 2-110, according to signal measurement results of RAN nodes of the terminal and other determination conditions. In the case of conditional handover, one or more potential target RAN nodes may be determined, and a procedure for each of the potential target RAN node and CHO may be performed. FIG. 2 includes only a procedure for CHO with one potential target RAN node. However, this is merely an embodiment, and the same procedure as that disclosed in FIG. 2 may be performed with another potential target RAN node. When DAPS HO is performed, a procedure for DAPS HO with one target RAN node may be performed. After determining to perform CHO, the CU-CP of the source RAN node may transmit a HANDOVER REQUEST message to the potential target RAN node as in operation 2-120, and in the case of CHO, the HANDOVER REQUEST message may include an indication for CHO initiation, target cell ID information, and a content that proposes data forwarding for each data radio bearer or QoS flow. In the case of DAPS HO, instead of CHO indication, an indication for DAPS HO may be included. A CU-CP of the target RAN node having received a HANDOVER REQUEST message for CHO from the source RAN node may determine a CU-UP of the target RAN node to service the terminal, may transmit a BEARER CONTEXT SETUP REQUEST as in operation 2-130, and may request data forwarding information for each data radio bearer or QoS flow. One or more CU-UPs may be used for one terminal, and FIG. 2 includes only a procedure with one CU-UP, and when one or more CU-UPs are used, the same procedure may be performed for each CU-UP. The CU-UP of the target RAN node having received a BEARER CONTEXT SETUP REQUEST message may perform DRB configuration for a corresponding service, etc., and may transmit a BEARER CONTEXT SETUP RESPONSE message including data forwarding information for each data radio bearer or QoS flow to the CU-CP of the target RAN node, as in operation 2-140. The CU-CP of the target RAN node determines whether to accept handover, and then may transmit a HANDOVER REQUEST ACKNOWLEDGE message to the source RAN node, as in operation 2-150. Information necessary for CHO may be included in the message. The CU-CP of the source RAN node may transmit, as in operation 2-160, an RRC reconfiguration message to the terminal via the DU, and may receive an RRC reconfiguration complete message from the terminal and may complete CHO configuration, as in operation 2-170.

Thereafter, as in operation 2-200, it may be determined to perform early data forwarding in the CU-CP of the source RAN node. When conditional handover is configured for one or more target RANs or target cells, the CU-CP of the source RAN node may determine a target RAN node or a target cell that is subject to early data forwarding. As in operation 2-210, the CU-CP of the source RAN node may transmit a BEARER CONTEXT MODIFICATION REQUEST message to a CU-UP of the source RAN node. The message may include an indication for requesting early data forwarding from the CU-UP or a request for COUNT information of a first downlink (DL) PDCP packet forwarded during early data forwarding, or may include both of the above information. The CU-CP of the source RAN node may perform transmission including a list of information necessary for data forwarding, which is received from target RAN nodes. The CU-UP having received a BEARER CONTEXTION MODIFICATION REQUEST message from the CU-CP may perform configuration for data forwarding for each target RAN node or target cell included in an information list for data forwarding, and may transmit a BEARER CONTEXTION MODIFICATION RESPONSE message to the CU-CP, as in operation 2-220. The message may include the COUNT information of the forwarded first downlink (DL) PDCP packet. The CU-CP of the source RAN node may transmit, as in operation 2-230, an EARLY FORWARDING TRANSFER message including first DL COUNT information received from the CU-UP, to target RAN nodes in which CHO or DAPS is configured. The CU-CP of the target RAN node may transmit a BEARER CONTEXT MODIFICATION REQUEST message including the first DL COUNT information received from the source RAN node, to the CU-UP of the target RAN node, as in operation 2-240. The CU-UP of the target RAN node may respond by transmitting a BEARER CONTEXT MODIFICATION RESPONSE message to the CU-CP of the target RAN node, as in operation 2-250. In the CU-UP, after the terminal performs handover to the target RAN node, the first DL COUNT information may be used for encryption, etc. when the target RAN node transmits data to the terminal. The CU-UP of the source RAN node may start forwarding downlink (DL) data for the terminal to the target RAN node as in operation 2-300, while transmitting a BEARER CONTEXT MODIFICATION RESPONSE message including first DL COUNT to the CU-CP of the source RAN node as in operation 2-220.

Thereafter, if the source RAN node has already completed transmission of data to the terminal among DL data forwarded from the source RAN node to the target RAN node, the source RAN node may notify, if necessary, the target RAN node of data information that has already been successfully transmitted, and the target RAN node stores unnecessary data so as to reduce wasting of resources. To this end, the CU-CP or CU-UP of the source RAN node may determine whether to transfer discarding information of early data-forwarded data. Operation 2-400 to operation 2-450 represent cases in which the CU-CP of the source RAN node determines transferring of data discarding information. Operation 2-500 to operation 2-550 represent cases in which the CU-UP of the source RAN node determines transferring of data discarding information.

Specifically, when the CU-CP of the source RAN node determines, as in operation 2-400, a transfer of data discarding information, a BEARER CONTEXT MODIFICATION REQUEST message may be transmitted to the CU-UP of the source RAN node as in operation 2-410, the BEARER CONTEXT MODIFICATION REQUEST message including a request of DL discarding information related to data information having already been successfully transmitted to the terminal from among data forwarded to the target RAN node. The CU-UP of the source RAN node may transmit a BEARER CONTEXT MODIFICATION RESPONSE message including the DL discarding information to the CU-CP of the source RAN node, as in operation 2-420. The CU-CP of the source RAN node having received the message may transmit, as in operation 2-430, an EARLY FORWARDING TRANSFER message including the DL discarding information to target RAN nodes in which CHO or DAPS is configured. The CU-CP of the target RAN node may transmit a BEARER CONTEXT MODIFICATION REQUEST message including the DL discarding information to the CU-UP of the target RAN node, as in operation 2-440. The CU-UP may respond with the BEARER CONTEXT MODIFICATION RESPONSE message, as in operation 2-450.

When the CU-UP of the source RAN node determines, as in operation 2-500, a transfer of data discarding information, the CU-UP of the source RAN node may transmit, to the CU-CP of the source RAN node, a BEARER CONTEXT MODIFICATION REQUIRED message including the DL discarding information related to data information having already been successfully transmitted to the terminal from among data forwarded to the target RAN node, as in operation 2-510. The CU-CP of the source RAN node may respond by transmitting a BEARER CONTEXT MODIFICATION CONFIRM message to the CU-CP of the source RAN node, as in operation 2-520. The CU-CP of the source RAN node having received a BEARER CONTEXT MODIFICATION REQUIRED message may transmit, as in operation 2-530, the EARLY FORWARDING TRANSFER message including the DL discarding information to target RAN nodes in which CHO or DAPS is configured. The CU-CP of the target RAN node may transmit, as in operation 2-540, the BEARER CONTEXT MODIFICATION REQUEST message including the DL discarding information to the CU-UP of the target RAN node, and the CU-UP of the target RAN node may respond to the CU-CP of the target RAN node via the BEARER CONTEXT MODIFICATION RESPONSE message, as in operation 2-550.

Thereafter, according to a handover triggering condition configured for the terminal via the RRC reconfiguration message by the source RAN node in operation 2-160, when the terminal is to perform handover as in operation 2-600, the terminal may perform random access to a target cell of the target RAN node as in operation 2-610. After the random access is successful, the terminal may transmit the RRC reconfiguration complete message to the target RAN node, as in operation 2-620. The CU-CP of the target RAN node having received the RRC reconfiguration complete message from the terminal may transmit, to the source RAN node, a HANDOVER SUCCESS message indicating that the terminal has performed handover, as in operation 2-630. As in operation 2-800, a procedure of updating a data path between a core network node, the RAN node for data transmission of the UE (terminal), and a core network may be performed. The CU-CP of the source RAN node having received the HANDOVER SUCCESS message may transmit, in operation 2-640, a BEARER CONTEXT MODIFICATION REQUEST message including PDCP SN status request information, etc., to the CU-UP, as in a conventional handover procedure, and the CU-UP may transmit a BEARER CONTEXT MODIFICATION RESPONSE message including PDCP SN status information to the CU-CP in operation 2-650. The CU-CP of the source RAN node having received PDCP DL/UL COUNT information may transmit an SN STATUS TRANSFER message including DL/UL SN status information to the target RAN node, as in operation 2-660. The CU-CP of the target RAN node having received the SN STATUS TRANSFER message may transmit a BEARER CONTEXT MODIFICATION REQUEST message including the PDCP SN status information to the CU-UP, as in operation 2-670. The CU-UP of the target RAN node may respond by transmitting the BEARER CONTEXT MODIFICATION RESPONSE message to the CU-CP, as in operation 2-680. The CU-UP of the source RAN node may transmit, as in operation 2-650, the BEARER CONTEXT MODIFICATION RESPONSE message including PDCP SN status information to the CU-CP, while continuing DL data forwarding to the target RAN node as in operation 2-700 and concurrently proceeding with uplink (UL) data forwarding when a request is configured.

Thereafter, the CU-CP of the target RAN node may transmit a UE CONTEXT RELEASE message to the source RAN node, as in operation 2-900. The CU-CP of the source RAN node having received the message may transmit a BEARER CONTEXT RELEASE COMMAND message to the CU-UP of the source RAN node, as in operation 2-910. The CU-UP of the source RAN node may respond by transmitting a BEARER CONTEXT RELEASE COMPLETE message, as in operation 2-920. Further, even if the CU-UP of the source RAN node has deleted related information and configuration for the terminal (UE), and the terminal has performed no handover, if there is another target RAN node in which conditional handover has already been configured, a HANDOVER CANCEL message is transmitted to enable cancellation of the preconfigured conditional handover.

FIG. 3 shows an embodiment of a case in which a CU-UP of a source RAN node determines whether to perform early data forwarding, and supports early data forwarding. When the CU-CP receives a measurement report transmitted by a terminal (UE) in operation 3-100 of FIG. 3 via a DU of the source RAN node, the source RAN node may determine to perform conditional handover (CHO) as in operation 3-110 according to signal measurement results of RAN nodes of the terminal and other determination conditions. The source RAN node may determine a potential target RAN node. In the case of conditional handover, one or more potential target RAN nodes may be determined, and a procedure for each of the potential target RAN node and CHO may be performed. On the other hand, FIG. 3 includes only a procedure for CHO with one potential target RAN node, and the same procedure may be performed with another potential target RAN node. When DAPS HO is performed, a procedure for DAPS HO with one target RAN node may be performed. After determining to perform CHO, the CU-CP of the source RAN node may transmit a HANDOVER REQUEST message to the potential target RAN node, as in operation 3-120. In the case of CHO, the HANDOVER REQUEST message may include an indication for CHO initiation, target cell ID information, and a content that proposes data forwarding for each data radio bearer or QoS flow. In the case of DAPS HO, instead of CHO indication, an indication for DAPS HO may be included. A CU-CP of the target RAN node having received the HANDOVER REQUEST message for CHO from the source RAN node may determine a CU-UP of the target RAN node to service the terminal, may transmit a BEARER CONTEXT SETUP REQUEST message to the CU-UP of the target RAN node as in operation 3-130, and may request data forwarding information for each data radio bearer or QoS flow. One or more CU-UPs may be used for one terminal, and FIG. 3 includes only a procedure with one CU-UP, and when one or more CU-UPs are used, the same procedure is performed for each CU-UP. The CU-UP of the target RAN node having received the BEARER CONTEXT SETUP REQUEST message may perform DRB configuration for a corresponding service, etc., and may transmit a BEARER CONTEXT SETUP RESPONSE message including data forwarding information for each data radio bearer or QoS flow to the CU-CP of the target RAN node, as in operation 3-140. The CU-CP of the target RAN node determines whether to accept handover, and then may transmit a HANDOVER REQUEST ACKNOWLEDGE message to the source RAN node, as in operation 3-150. The message may include information necessary for the CHO. The CU-CP of the source RAN node may transmit an RRC reconfiguration message to the terminal via the DU, as in operation 3-160. As in operation 3-170, the terminal may respond by transmitting an RRC reconfiguration complete message. The CU-CP having received the RRC reconfiguration complete message via the DU of the source RAN node may transmit a BEARER CONTEXT MODIFICATION message to the CU-UP as in operation 3-180, may indicate that CHO has been configured in the message, and may include information for forwarding data transferred from the target RAN node. When conditional handover is configured for one or more target RAN nodes or target cells, the CU-CP may determine target RAN nodes or target cells subject to early data forwarding, and then may include a list of information necessary for data forwarding for each target RAN node or target cell. When an information list for data forwarding is received while CHO is configured, unlike in a case of conventional handover, the CU-UP does not start data forwarding immediately, and may start data forwarding after the CU-UP determines whether to perform data forwarding.

Thereafter, if the CU-UP of the source RAN node determines, in operation 3-200, to start early data forwarding, the CU-UP of the source RAN node may transmit a BEARER CONTEXT MODIFICATION REQUIRED message to the CU-CP of the source RAN node, as in operation 3-210. The message may include an indication indicating the starting of early data forwarding to the CU-CP, COUNT information of a forwarded first downlink (DL) PDCP packet, or both. The CU-CP of the source RAN node having received a BEARER CONTEXTION MODIFICATION REQUIRED message from the CU-UP of the source RAN node may respond by transmitting a BEARER CONTEXTION MODIFICATION CONFIRM message to the CU-CP, as in operation 3-220. The CU-CP of the source RAN node may transmit, as in operation 3-230, an EARLY FORWARDING TRANSFER message including first DL COUNT information received from the CU-UP of the source RAN node, to target RAN nodes in which CHO or DAPS is configured. The CU-CP of the target RAN node may transmit a BEARER CONTEXT MODIFICATION REQUEST message including the first DL COUNT information received from the source RAN node, to the CU-UP of the target RAN node, as in operation 3-240. Further, the CU-UP of the target RAN node may respond by transmitting a BEARER CONTEXT MODIFICATION RESPONSE message to the CU-CP of the target RAN node, as in operation 3-250. In the CU-UP of the target RAN node, the first DL COUNT information is used for performing encryption when data is transmitted from the target RAN node to the terminal after the terminal performs handover to the target RAN node. The CU-UP of the source RAN node may start forwarding downlink (DL) data for the terminal to the target RAN node as in operation 3-300, while transmitting a BEARER CONTEXT MODIFICATION REQUIRED message including first DL COUNT to the CU-CP of the source RAN node as in operation 3-210.

Thereafter, if the source RAN node has already completed transmission of data to the terminal among DL data forwarded from the source RAN node to the target RAN node, the source RAN node may notify, if necessary, the target RAN node of data information that has already been successfully transmitted, and the target RAN node stores unnecessary data so as to reduce wasting of resources. When the CU-UP of the source RAN node determines, as in operation 3-400, a transfer of data discarding information, the CU-UP of the source RAN node may transmit, to the CU-CP of the source RAN node, a BEARER CONTEXT MODIFICATION REQUIRED message including the DL discarding information related to data information having already been successfully transmitted to the terminal from among data forwarded to the target RAN node, as in operation 3-410. The CU-CP of the source RAN node may respond by transmitting a BEARER CONTEXT MODIFICATION CONFIRM message to the CU-UP of the source RAN node, as in operation 3-420. The CU-CP of the source RAN node having received a BEARER CONTEXT MODIFICATION REQUIRED message may transmit, as in operation 3-430, the EARLY FORWARDING TRANSFER message including the DL discarding information to target RAN nodes in which CHO or DAPS is configured. The CU-CP of the target RAN node may transmit, as in operation 3-440, the BEARER CONTEXT MODIFICATION REQUEST message including the DL discarding information to the CU-UP of the target RAN node, and the CU-UP of the target RAN node may respond via a BEARER CONTEXT MODIFICATION RESPONSE message, as in operation 3-450.

Thereafter, according to a handover triggering condition configured for the terminal by the source RAN node via the RRC reconfiguration message in operation 3-160, when the terminal is to perform handover as in operation 3-500, the terminal may perform random access to a target cell of the target RAN node as in operation 3-510. After the random access is successful, the terminal may transmit the RRC reconfiguration Complete message to the target RAN node, as in operation 3-520. The CU-CP of the target RAN node having received the RRC reconfiguration Complete message from the terminal may transmit, to the source RAN node, a HANDOVER SUCCESS message indicating that the terminal has performed handover, as in operation 3-530. As in operation 3-700, a procedure of updating a data path between a core network node, the RAN node for data transmission of the UE (terminal), and a core network may be performed. The CU-UP of the source RAN node may transmit the BEARER CONTEXT MODIFICATION RESPONSE message including PDCP SN status information to the CU-CP of the source RAN node, as in operation 3-550. The CU-CP of the source RAN node having received PDCP DL/UL COUNT information may transmit an SN STATUS TRANSFER message including DL/UL SN status information to the target RAN node, as in operation 3-560. The CU-CP of the target RAN node having received the SN STATUS TRANSFER message may transmit a BEARER CONTEXT MODIFICATION REQUEST message including the PDCP SN status information to the CU-UP of the target RAN node, as in operation 3-570. The CU-UP of the target RAN node may respond by transmitting a BEARER CONTEXT MODIFICATION RESPONSE message to the CU-CP of the target RAN node, as in operation 3-580. The CU-UP of the source RAN node may transmit the BEARER CONTEXT MODIFICATION RESPONSE message including the PDCP SN status information to the CU-CP of the source RAN node, as in operation 3-550. As in operation 3-600, while continuing DL data forwarding to the target RAN node, uplink (UL) data forwarding may be concurrently performed when a request is configured.

Thereafter, the CU-CP of the target RAN node may transmit a UE CONTEXT RELEASE message to the source RAN node, as in operation 3-800. The CU-CP of the source RAN node having received the message may transmit a BEARER CONTEXT RELEASE COMMAND message to the CU-UP of the source RAN node, as in operation 3-810. Further, even if the CU-UP of the source RAN node has responded by transmitting a BEARER CONTEXT RELEASE COMPLETE message as in operation 3-820, and has deleted related information and configuration for the terminal (UE), and the terminal has performed no handover, if there is another target RAN node in which conditional handover has already been configured, a HANDOVER CANCEL message is transmitted to enable cancellation of the preconfigured conditional handover.

FIG. 4 is diagrams illustrating examples of information additionally required for a signaling message exchanged between a CU-CP and a CU-UP in order to support the embodiments of FIG. 2 and FIG. 3. FIG. 4 is an example of information to be additionally included in a BEARER CONTEXT MODIFICATION REQUEST message, a BEARER CONTEXT MODIFICAREION RESPONSE message, and a BEARER CONTEXT MODIFICATION REQUIRED message which have been previously used. However, if necessary, a new signaling message may be defined and included, or information of FIG. 4 may be included in another existing signaling message.

(a) of FIG. 4 is an example of information to be included in a BEARER CONTEXT MODIFICATION REQUEST message. In (a) of FIG. 4, early data forwarding request information may be included for each data radio bearer (DRB) provided for a corresponding terminal, so as to be used by a CU-CP of a source RAN node to request early data forwarding from a CU-UP. The CU-UP of the source RAN node may include a list of data forwarding information for each target RAN node or target cell required for data forwarding to target RAN nodes. The data forwarding information is GPRS tunneling protocol (GTP) tunnel information, and may include a transport layer address for a GRP tunnel configuration and tunnel endpoint identifier (TEID) information including, for example, an IP address and a port number. When early data forwarding starts, first PDCP DL COUNT request information and PDCP DL discarding information request information may be included, wherein the first PDCP DL COUNT request information includes whether a hyper frame number (HFN) and a PDCP sequence number (SN) of a first downlink (DL) SDU packet forwarded by the CU-UP of the source RAN node are included, and the PDCP DL discarding information request information enables a request for information necessary for data discarding in a target RAN node after early data forwarding starts. The BEARER CONTEXT MODIFICATION REQUEST message transmitted to the CU-UP from the CU-CP of the target RAN node may include PDCP DL discarding information and first PDCP DL COUNT information received in the source RAN node from the CU-CP to the CU-UP in order to process packets which are early data forwarded by the CU-UP.

(b) of FIG. 4 is an example of information to be included in a BEARER CONTEXT MODIFICATION RESPONSE message or a BEARER CONTEXT MODIFICATION REQUIRED message. In (b) of FIG. 4, according to contents included in the PDCP DL discarding information request information and first PDCP DL COUNT information request information included in the BEARER CONTEXT MODIFICATION REQUEST message transmitted by the CU-UP, the CU-UP of the source RAN node may include first PDCP DL COUNT request information and PDCP DL discarding information request information, wherein the first PDCP DL COUNT request information includes whether a hyper frame number (HFN) and a PDCP sequence number (SN) of a first downlink (DL) SDU packet forwarded by the CU-UP for each data radio bearer (DRB) provided for the terminal are included, and the PDCP DL discarding information request information enables a request of information necessary for data discarding in the target RAN node after early data forwarding starts. When the CU-UP of the source RAN node determines early data forwarding, the information may be included in the BEARER CONTEXT MODIFICATION REQUIRED message transmitted to the CU-CP from the CU-UP of the source RAN node.

FIG. 5 shows examples of information additionally required for a signaling message exchanged between a CU-CP and a CU-UP to support the embodiment of FIG. 3. Further, in the additionally required information, FIG. 5 shows additional information other than the information included in FIG. 4. FIG. 5 is an example of information to be additionally included in a BEARER CONTEXT MODIFICATION REQUEST message and a BEARER CONTEXT MODIFICAREION REQUIRED message which have been previously used. However, if necessary, a new signaling message may be defined and included, or the information of FIG. 5 may be included in another existing signaling message.

(a) of FIG. 5 is an example of information to be included in a BEARER CONTEXT MODIFICATION REQUEST message. In (a) of FIG. 5, if it is determined to perform conditional handover or DAPS handover in a CU-CP of a source RAN node, CHO Trigger information or DAPS indicator information may be included, wherein the CHO Trigger information indicates whether conditional handover is being performed while transmitting the BEARER CONTEXT MODIFICATION REQUEST message to the CU-UP, and the DAPS indicator information indicates whether DAP handover is being performed. As in (a) of FIG. 4, the BEARER CONTEXT MODIFICATION REQUEST message may include, along with this information, data forwarding-related information of one or more target RAN nodes for data forwarding, and the CU-UP of the source RAN node may determine a time point of early data forwarding or may perform late data forwarding according to a subsequent CU-UP determination on the basis of information including CHO trigger or DAPS indicator, instead of performing data forwarding in the same way as that when conventional handover is performed.

(b) of FIG. 5 and (c) of FIG. 5 are examples of information to be included in a BEARER CONTEXT MODIFICATION REQUIRED message. If it is determined to perform early data forwarding in the CU-UP of the source RAN node, a notification that early data forwarding has started may be provided to the CU-CP by using the BEARER CONTEXT MODIFICATION REQUIRED message. Determination on the starting of early data forwarding may be indicated with a terminal level as in (b) of FIG. 5 or with a data radio bearer (DRB) level as in (c) of FIG. 5. When early data forwarding is performed in the CU-UP of the source RAN node, first PDCP DL COUNT information may be transmitted as in (b) of FIG. 4 according to the indication.

When conditional handover is configured, one RAN node may support one or more cells, and therefore the source RAN node may request a conditional handover configuration from one or more cells among cells supported by one target RAN node. However, a conventional handover procedure supports configuration of only one target cell in a one-time handover configuration procedure, and even when conditional handover is performed, conditional handover may be configured for only one target cell during a handover procedure for conditional handover configuration in the same manner. If it is determined to configure conditional handover for one or more target cells supported by one target RAN node, the source RAN node proceeds with a handover procedure for a separate conditional handover configuration for each target cell subject to a target RAN node. In the case of the same terminal, in the source RAN node, an identifier, which enables identification of the terminal, e.g., source RAN UE APID, is configured to have the same value, and target cell ID information, which is subject to the target, is configured to be different for a handover request message transmitted to the target RAN node, and therefore it is determined whether handover procedures with different target RAN nodes correspond to multiple CHO configurations for the same terminal.

Figure 6A:
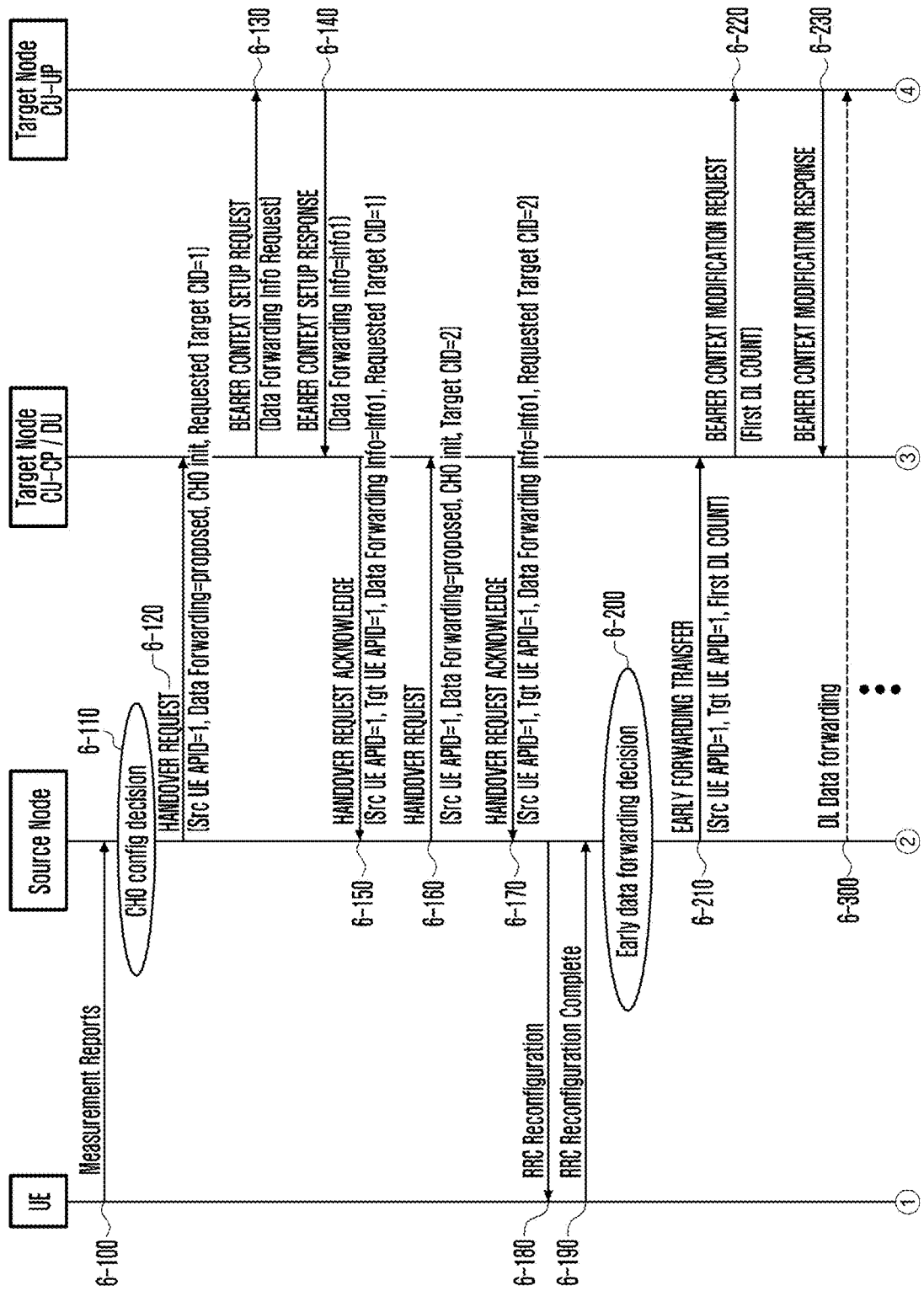
FIG. 6A-6B is a diagram illustrating an embodiment of, when conditional handover is configured for multiple target cells of a single target RAN node, efficiently performing early data forwarding using the same data forwarding information.
Figure 6B:
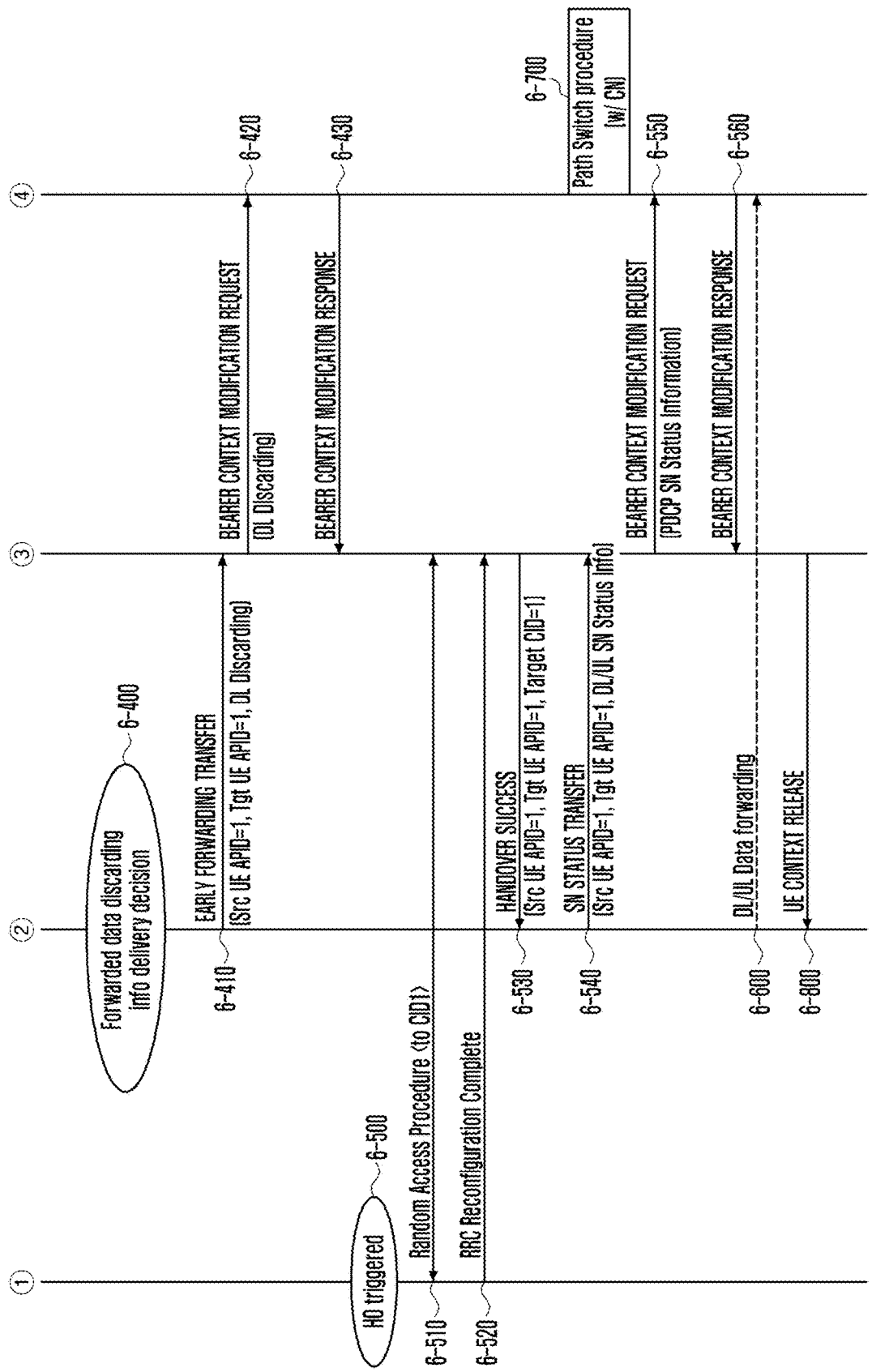
Figure 7A:
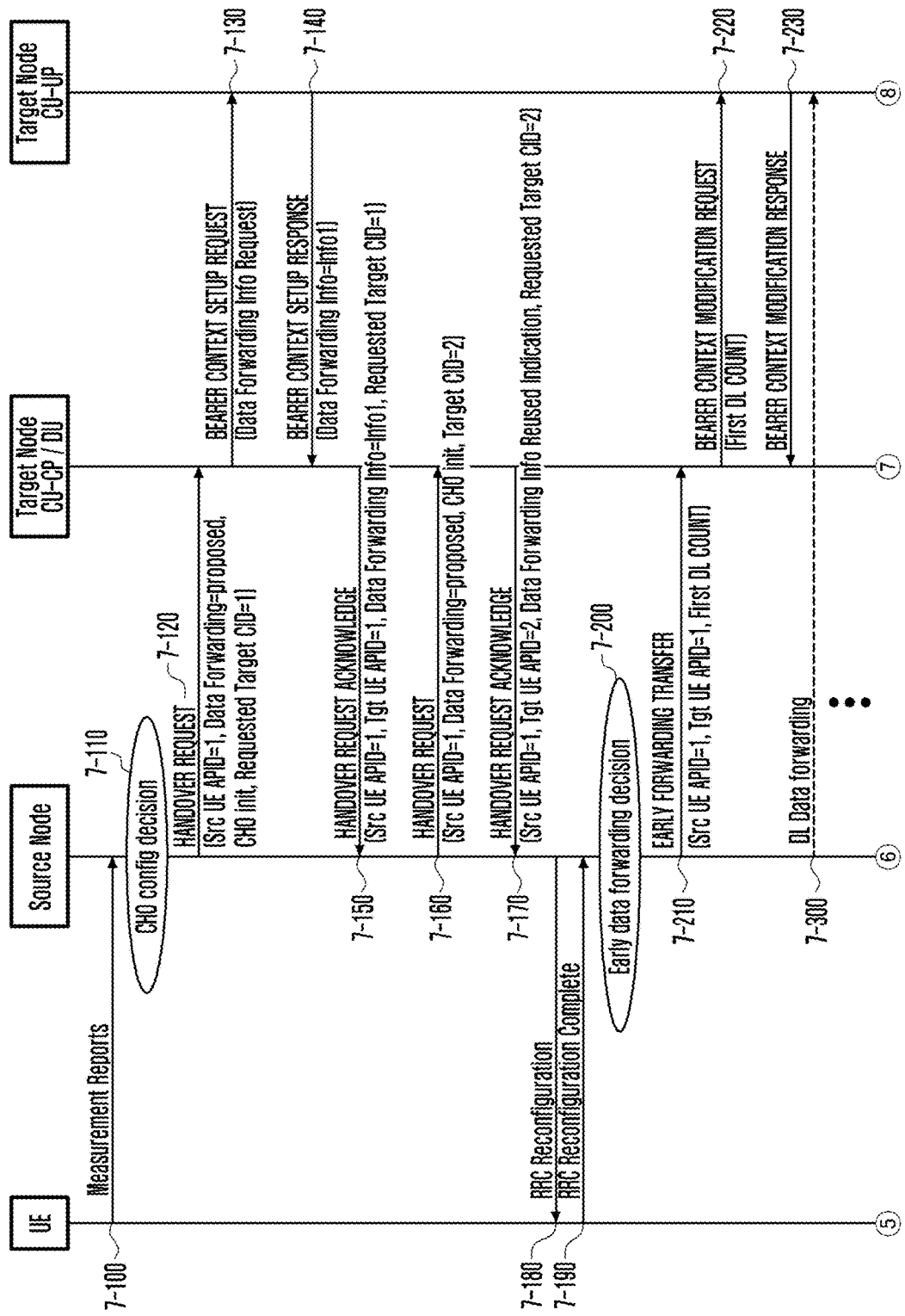
FIG. 7A-7B is a diagram illustrating an embodiment of, when conditional handover is configured for multiple target cells of a single target RAN node, efficiently performing early data forwarding using indication information indicating that the same data forwarding information is used.
Figure 7B:
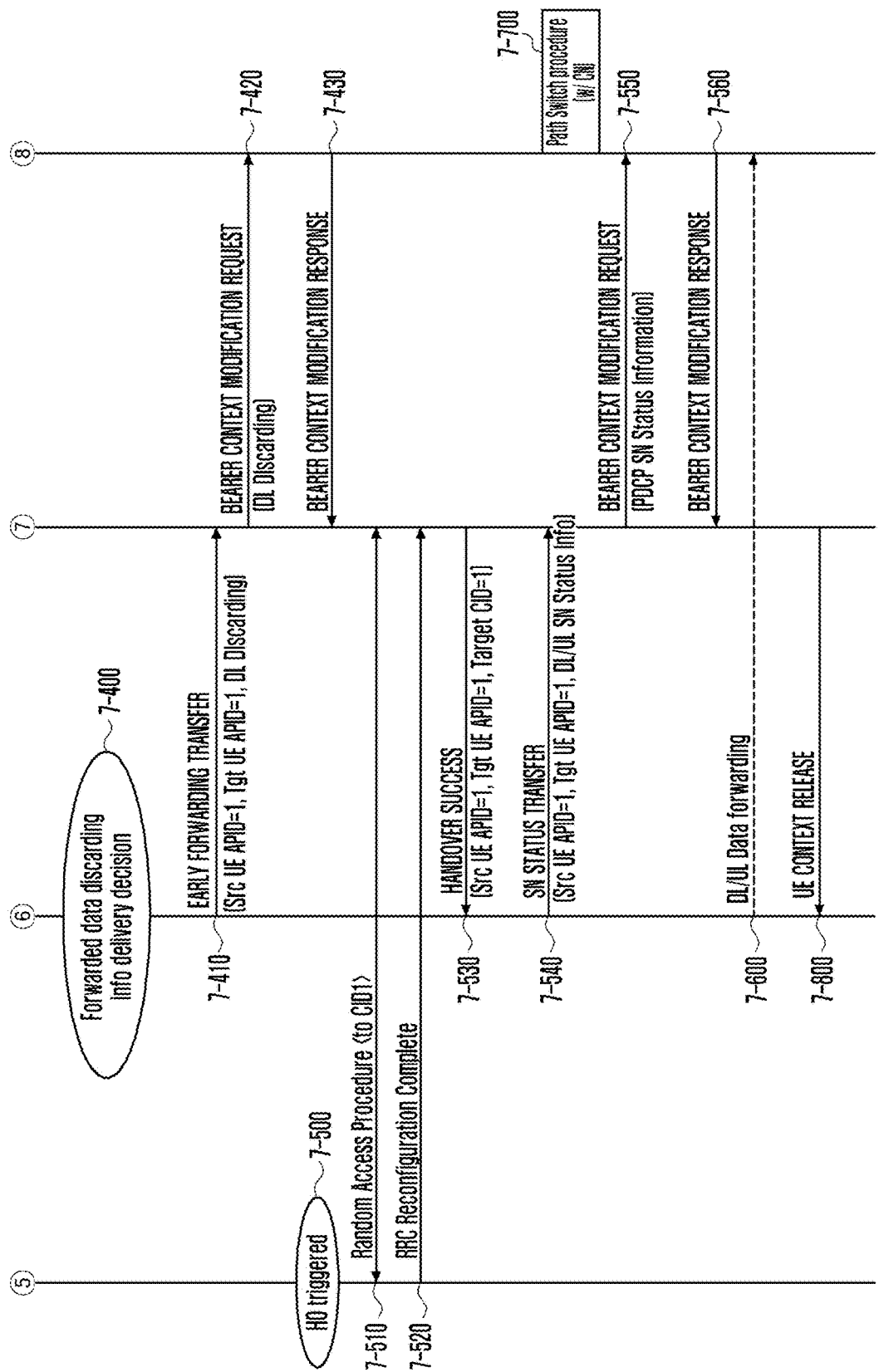

FIG. 6 and FIG. 7 show embodiments for efficiently performing early data forwarding when conditional handover is configured for multiple target cells of one target RAN node for one terminal. When conditional handover is configured for multiple target cells of one target RAN node, according to an existing conditional handover configuration procedure, data forwarding should be performed for each target cell. In this case, the same data of the same terminal should be unnecessarily and redundantly forwarded to the same target RAN node, and a signaling message including the same information, such as a related EARLY FORWARDING TRASNFER message, is redundantly transmitted to the target RAN node. According to embodiments disclosed in FIG. 6 and FIG. 7, when multiple target cells of one target RAN node are CHO-configured, it may be possible to prevent unnecessary redundant data forwarding from the source RAN node to the target RAN node, and to prevent unnecessary redundant transmission of the signaling message. In FIG. 6 and FIG. 7, a RAN node may be divided into a CU-CP, a CU-UP, and a DU, or may be configured as one RAN entity. FIG. 6 and FIG. 7 show that a CU-CP and a DU are configured to be one entity and a CU-UP is configured to be a separate entity in only the target RAN node. However, the CU-CP and the DU may be separated again, and whether the CU-CP and DU in the target RAN node are integrated or separated, and an internal configuration of the source RAN node may operate regardless of the contents of the disclosure.

FIG. 6 illustrates an embodiment in which, in the case of a conditional handover configuration for the same terminal, a target RAN node includes the same information in data forwarding information included in a HANDOVER REQEUST ACKNOWLEDGE message for responding to a source RAN node, so as to prevent the source RAN node from redundant data forwarding to the target RAN node and from redundant transmission of a signaling message. In operation 6-100 in FIG. 6, the source RAN node may receive a measurement report transmitted by a terminal. According to signal measurement results of RAN nodes of the terminal and other determination conditions, the source RAN node may determine to perform conditional handover (CHO) and determine a potential target RAN node, as in operation 6-110. In the case of conditional handover, one or more potential target RAN nodes may be determined, and a procedure for each of the potential target RAN node and CHO may be performed. However, FIG. 6 includes only a procedure for CHO with one potential target RAN node, and the same procedure may be performed with another potential target RAN node. In operation 6-110 of FIG. 6, it may be determined to configure conditional handover for one or more cells among cells supported by one target RAN node. After determining to perform CHO, the source RAN node may transmit a HANDOVER REQUEST message to the potential target RAN node as in operation 6-120, and in the case of CHO, the HANDOVER REQUEST message may include an indication for CHO initiation, target cell ID information, and a content that proposes data forwarding for each data radio bearer or QoS flow. A CU-CP of the target RAN node having received a HANDOVER REQUEST message for CHO from the source RAN node may determine a CU-UP of the target RAN node to service the terminal, may transmit a BEARER CONTEXT SETUP REQUEST as in operation 6-130, and may request data forwarding information for each data radio bearer or QoS flow. One or more CU-UPs may be used for one terminal. In FIG. 6, only a procedure with one CU-UP is included, and if one or more CU-UPs are used, the same procedure may be performed for each CU-UP. The CU-UP of the target RAN node having received the BEARER CONTEXT SETUP REQUEST message may perform DRB configuration for a corresponding service, etc., and may transmit a BEARER CONTEXT SETUP RESPONSE message including data forwarding information for each data radio bearer or QoS flow to the CU-CP of the target RAN node, as in operation 6-140. The CU-CP of the target RAN node determines whether to accept handover, and then may transmit a HANDOVER REQUEST ACKNOWLEDGE message to the source RAN node, as in operation 6-150. Information necessary for CHO, such as information for data forwarding, may be included in the message. Since it is determined, in operation 6-110, to configure CHO for multiple cells of the same target RAN node, the source RAN node may transmit a HANDOVER REQUEST message for one target cell to the target RAN node as in operation 6-120, and then may transmit a HANDOVER REQUEST message for another target cell to the same target RAN node as in operation 6-160. Here, in the two HANDOVER REQUEST messages, an identifier used by the source RAN node to identify the terminal, for example, a source RAN node UEAP ID, may be configured to have the same value, so as to indicate that the target RAN node corresponds to the CHO configuration for multiple target cells for the same terminal. In the two HANDOVER REQUEST messages, requested target cell ID information including each piece of target cell information may be differently configured so as to have a value corresponding to each target cell. The CU-CP of the target RAN node, which has received the HANDOVER REQUEST message from the source RAN node in operation 6-160, may determine whether conditional handover for another target cell has already been configured for the terminal, by using the included identifier used to identify the terminal, and if the conditional handover configuration has already been performed for the terminal, the CU-CP of the target RAN node may not additionally transmit a BEARER CONTEXT REQUEST message to the CU-UP of the target RAN node as in operation 6-130, and may transmit the HANDOVER REQUEST ACKNOWLEDGE message to the source RAN node as in operation 6-170. The message may include information for the same data forwarding as that which has already been performed to the same source RAN node in operation 6-150 for data forwarding for the terminal. The source RAN node having received the HANDOVER REQUEST ACKNOWLEDGE message in operation 6-170 may confirm that the same data forwarding information for the same terminal is received from the same target RAN node, and may proceed with an internal configuration to enable only one data forwarding. If the CU-CP and CU-UP are separated in the source RAN node, the CU-CP of the source RAN node may perform a signaling procedure of transferring data forwarding information of the same target RAN node, which is required for one terminal, to the CU-UP only once. When HANDOVER REQUEST ACKNOWLEDGEMENT messages are received from target RAN nodes, the source RAN node may transmit an RRC reconfiguration message to the terminal as in operation 6-180, receive an RRC reconfiguration complete message from the terminal, and complete CHO configuration as in operation 6-190.

Thereafter, if it is determined to perform early data forwarding in the source RAN node as in operation 6-200, and when conditional handover is configured for one or more target RAN nodes, the CU-CP may determine a target RAN node that is subject to early data forwarding. The source RAN node may transmit, as in operation 6-210, an EARLY FORWARDING TRANSFER message including first DL COUNT information of forwarded data, to target RAN nodes in which CHO is configured. Only one EARLY FORWARDING TRANSFER message may be transmitted to one target RAN node for one terminal regardless of whether multiple target cells of one target RAN node are CHO-configured. The CU-CP of the target RAN node may transmit a BEARER CONTEXT MODIFICATION REQUEST message including the first DL COUNT information received from the source RAN node, to the CU-UP of the target RAN node, as in operation 6-220. The CU-UP of the target RAN node may respond by transmitting the BEARER CONTEXT MODIFICATION RESPONSE message to the CU-CP, as in operation 6-230. In the CU-UP of the target RAN node, the first DL COUNT information may be used for performing encryption when data is transmitted from the target RAN node to the terminal after the terminal performs handover to the target RAN node. The source RAN node may start forwarding downlink (DL) data for the terminal to the target RAN node as in operation 6-300, while transmitting the EARLY FORWARDING TRANSFER message including first DL COUNT to the target RAN node as in operation 6-210.

Thereafter, if the source RAN node has already completed transmission of data to the terminal among DL data forwarded from the source RAN node to the target RAN node, the source RAN node may notify, if necessary, the target RAN node of data information that has already been successfully transmitted, and the target RAN node stores unnecessary data so as to reduce wasting of resources. To this end, when the source RAN node determines, as in operation 6-400, a transfer of data discarding information in the CU-CP of the source RAN node, the source RAN node may transmit, as in operation 6-410, the EARLY FORWARDING TRANSFER message including DL discarding information to the target RAN nodes in which CHO is configured, wherein only one EARLY FORWARDING TRANSFER message may be transmitted to one target RAN node for one terminal, regardless of whether multiple target cells of one target RAN node are CHO-configured. The CU-CP of the target RAN node may transmit, as in operation 6-420, the BEARER CONTEXT MODIFICATION REQUEST message including the DL discarding information to the CU-UP of the target RAN node, and the CU-UP of the target RAN node may respond via a BEARER CONTEXT MODIFICATION RESPONSE message, as in operation 6-430.

Thereafter, according to a handover triggering condition configured for the terminal by the source RAN node via the RRC reconfiguration message in operation 6-180, when the terminal is to perform handover as in operation 6-500, the terminal may perform random access to a target cell of the target RAN node as in operation 6-510. After the random access is successful, the terminal may transmit the RRC reconfiguration Complete message to the target RAN node, as in operation 6-520. The CU-CP of the target RAN node having received the RRC reconfiguration complete message from the terminal may transmit, to the source RAN node, a HANDOVER SUCCESS message indicating that the terminal has performed handover, as in operation 6-530, and may perform an update procedure of a data path between a core network and the RAN node for data transmission of the terminal (UE) with a core network node, as in operation 6-700. The source RAN node having received the HANDOVER SUCCESS message may transmit an SN STATUS TRANSFER message including DL/UL SN status information, etc. to the target RAN node in operation 6-540, as in a conventional handover procedure. The CU-CP of the target RAN node having received the SN STATUS TRANSFER message may transmit a BEARER CONTEXT MODIFICATION REQUEST message including the PDCP SN status information to the CU-UP of the target RAN node, as in operation 6-550. The CU-UP of the target RAN node may respond by transmitting the BEARER CONTEXT MODIFICATION RESPONSE message to the CU-CP, as in operation 6-560. The source RAN node may transmit, as in operation 6-540, the SN STATUS TRANSFER message including DL/UL SN status information to the target RAN node, while continuing DL data forwarding to the target RAN node as in operation 6-600 and concurrently proceeding with uplink (UL) data forwarding when a request is configured.

Thereafter, the target RAN node transmits a UE CONTEXT RELEASE message to the source RAN node as in operation 6-800, the source RAN node having received the same deletes related information and configuration for the terminal (UE), and the terminal has performed no handover. However, if there is another target RAN node in which conditional handover has already been configured, a HANDOVER CANCEL message is transmitted so that the pre-configured conditional handover may be canceled.

FIG. 7 is an embodiment in which, in the case of a conditional handover configuration for the same terminal, a target RAN node includes information indicating that the same data forwarding information is used for a HANDOVER REQEUST ACKNOWLEDGE message for responding to a source RAN node, so as to prevent the source RAN node from redundant data forwarding to the target RAN node and from redundant transmission of a signaling message. When the source RAN node receives a measurement report transmitted by a terminal (UE) in operation 7-100 of FIG. 7, the source RAN node may determine to perform conditional handover (CHO) and may determine a potential target RAN node, as in operation 7-110 according to signal measurement results of RAN nodes of the terminal and other determination conditions. In the case of conditional handover, one or more potential target RAN nodes may be determined, and a procedure for each of the potential target RAN node and CHO may be performed. However, FIG. 7 includes only a procedure for CHO with one potential target RAN node. However, this is merely an embodiment, and the same procedure may be performed with another potential target RAN node. In operation 7-110 of FIG. 7, it may be determined to configure conditional handover for one or more cells among cells supported by one target RAN node. After determining to perform CHO, the source RAN node may transmit a HANDOVER REQUEST message to the potential target RAN node, as in operation 7-120. In the case of CHO, the HANDOVER REQUEST message may include an indication for CHO initiation, target cell ID information, and a content that proposes data forwarding for each data radio bearer or QoS flow. A CU-CP of the target RAN node having received a HANDOVER REQUEST message for CHO from the source RAN node may determine a CU-UP of the target RAN node to service the terminal, may transmit a BEARER CONTEXT SETUP REQUEST message as in operation 7-130, and may request data forwarding information for each data radio bearer or QoS flow. One or more CU-UPs may be used for one terminal, and FIG. 6 includes only a procedure with one CU-UP, and when one or more CU-UPs are used, the same procedure may be performed for each CU-UP. The CU-UP of the target RAN node having received the BEARER CONTEXT SETUP REQUEST message may perform DRB configuration for a corresponding service, etc., and may transmit a BEARER CONTEXT SETUP RESPONSE message including data forwarding information for each data radio bearer or QoS flow to the CU-CP of the target RAN node, as in operation 7-140. The CU-CP of the target RAN node determines whether to accept handover, and then may transmit a HANDOVER REQUEST ACKNOWLEDGE message to the source RAN node, as in operation 7-150, wherein the message includes information required for CHO, such as information for data forwarding. The source RAN node has determined to configure CHO for multiple cells of the same target RAN node, in operation 7-110. Therefore, the source RAN node may transmit, to the target RAN node, a HANDOVER REQUEST message for one target cell as in operation 7-120, and then may transmit, to the same target RAN node, a HANDOVER REQUEST message for another target cell as in operation 7-160. Here, in the two HANDOVER REQUEST messages, an identifier used by the source RAN node to identify the terminal, for example, a source RAN node UEAP ID, may be configured to have the same value, so as to indicate that the target RAN node corresponds to the CHO configuration for multiple target cells for the same terminal. In the two HANDOVER REQUEST messages, requested target cell ID information including each piece of target cell information may be differently configured so as to have a value corresponding to each target cell. The CU-CP of the target RAN node, which has received the HANDOVER REQUEST message from the source RAN node in operation 7-160, may determine whether conditional handover for another target cell has already been configured for the terminal, by using the included identifier used to identify the terminal. If the conditional handover configuration has already been performed for the terminal, a BEARER CONTEXT REQUEST message is not additionally transmitted to the CU-UP of the target RAN node as in operation 7-130, and the HANDOVER REQUEST ACKNOWLEDGE message may be transmitted to the source RAN node as in operation 7-170. The message may already include data forwarding information reused indication information indicating that data forwarding information for the terminal, that is, data forwarding information included in another HANDOVER REQUEST ACKNOWLEDGE message, in which CHO has been configured for the terminal, is used in the same manner. The source RAN node having received the HANDOVER REQUEST ACKNOWLEDGE message in operation 7-170 may confirm, from the same target RAN node, that the same data forwarding information for the same terminal is used, and may proceed with an internal configuration to enable only one data forwarding. If the CU-CP and CU-UP are separated in the source RAN node, the CU-CP of the source RAN node may perform a signaling procedure of transferring data forwarding information of the same target RAN node, which is required for one terminal, to the CU-UP only once. When the source RAN node receives HANDOVER REQUEST ACKNOWLEDGEMENT messages from target RAN nodes, the source RAN node may transmit an RRC reconfiguration message to the terminal as in operation 7-180. The source RAN node may receive an RRC reconfiguration complete message from the terminal and complete CHO configuration, as in operation 7-190.

Thereafter, as in operation 7-200, it may be determined to perform early data forwarding in the source RAN node. When conditional handover is configured for one or more target RAN nodes, the CU-CP of the source RAN node may determine a target RAN node that is subject to early data forwarding. The source RAN node may transmit, as in operation 7-210, an EARLY FORWARDING TRANSFER message including first DL COUNT information of forwarded data, to target RAN nodes in which CHO is configured. Only one EARLY FORWARDING TRANSFER message may be transmitted to one target RAN node for one terminal regardless of whether multiple target cells of one target RAN node are CHO-configured. The CU-CP of the target RAN node may transmit a BEARER CONTEXT MODIFICATION REQUEST message including the first DL COUNT information received from the source RAN node, to the CU-UP of the target RAN node, as in operation 7-220. The CU-UP of the target RAN node may respond by transmitting the BEARER CONTEXT MODIFICATION RESPONSE message to the CU-CP, as in operation 7-230. In the CU-UP, after the terminal performs handover to the target RAN node, the first DL COUNT information may be used for encryption, etc. when the target RAN node transmits data to the terminal. The source RAN node may start forwarding downlink (DL) data for the terminal to the target RAN node as in operation 7-300, while transmitting the EARLY FORWARDING TRANSFER message including first DL COUNT to the target RAN node as in operation 7-210.

Thereafter, if the source RAN node has already completed transmission of data to the terminal among DL data forwarded from the source RAN node to the target RAN node, the source RAN node may notify, if necessary, the target RAN node of data information that has already been successfully transmitted, and the target RAN node stores unnecessary data so as to reduce wasting of resources. To this end, when the source RAN node determines, as in operation 7-400, a transfer of data discarding information in the CU-CP of the source RAN node, the source RAN node may transmit, as in operation 7-410, the EARLY FORWARDING TRANSFER message including DL discarding information to the target RAN nodes in which CHO is configured. At this time, only one EARLY FORWARDING TRANSFER message may be transmitted to one target RAN node for one terminal regardless of whether multiple target cells of one target RAN node are CHO-configured. The CU-CP of the target RAN node may transmit, as in operation 7-420, the BEARER CONTEXT MODIFICATION REQUEST message including the DL discarding information to the CU-UP, and the CU-UP may respond via the BEARER CONTEXT MODIFICATION RESPONSE message, as in operation 7-430.

Thereafter, according to the handover triggering condition configured for the terminal via the RRC reconfiguration message by the source RAN node in operation 7-180, the terminal may determine to perform handover, as in operation 7-500. As in operation 7-510, the terminal may perform random access to the target cell of the target RAN node. After the random access is successful, the terminal may transmit the RRC reconfiguration complete message to the target RAN node, as in operation 7-520. The CU-CP of the target RAN node having received the RRC reconfiguration complete message from the terminal may transmit, to the source RAN node, a HANDOVER SUCCESS message indicating that the terminal has performed handover, as in operation 7-530, and may perform an update procedure of a data path between a core network and the RAN node for data transmission of the terminal (UE) with a core network node, as in operation 7-700. The source RAN node having received the HANDOVER SUCCESS message may transmit an SN STATUS TRANSFER message including DL/UL SN status information, etc. to the target RAN node in operation 7-540, as in a conventional handover procedure. The CU-CP of the target RAN node having received the SN STATUS TRANSFER message may transmit a BEARER CONTEXT MODIFICATION REQUEST message including the PDCP SN status information to the CU-UP, as in operation 7-550. The CU-UP of the target RAN node may respond by transmitting the BEARER CONTEXT MODIFICATION RESPONSE message to the CU-CP, as in operation 7-560. The source RAN node may transmit, as in operation 7-540, the SN STATUS TRANSFER message including DL/UL SN status information to the target RAN node, while continuing DL data forwarding to the target RAN node as in operation 7-600 and concurrently proceeding with uplink (UL) data forwarding when a request is configured.

Thereafter, the target RAN node may transmit a UE CONTEXT RELEASE message to the source RAN node as in operation 7-800. Further, even if the source RAN node having received the message has deleted related information and configuration for the terminal (UE), and the terminal has performed no handover, if there is another target RAN node in which conditional handover has already been configured, a HANDOVER CANCEL message may be transmitted to enable cancellation of the preconfigured conditional handover.

Figure 8:
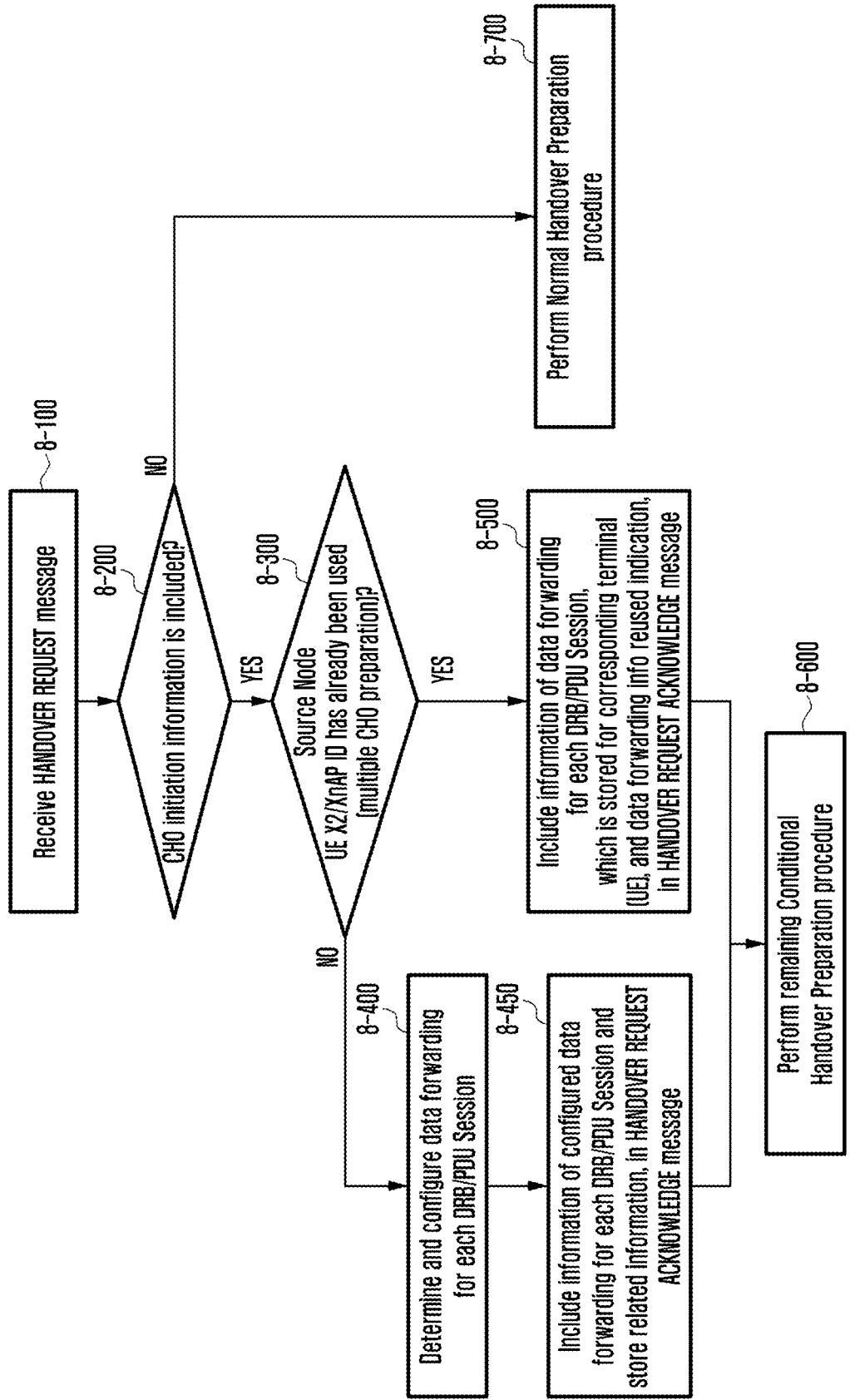
FIG. 8 is a diagram illustrating an embodiment of, when conditional handover is configured for multiple target cells of a single target RAN node, processing a received HANDOVER REQUEST message by the target RAN node in order to efficiently perform early data forwarding.

FIG. 8 shows an embodiment of, in the case of configuring conditional handover for multiple target cells of one target RAN node for one terminal, in order to efficiently perform early data forwarding, performing internal processing when the target RAN node or a CU-CP of the target RAN node receives a HANDOVER REQUEST message from a source RAN node. In FIG. 8, only processing necessary to efficiently support early data forwarding in a target RAN node is included, and other procedures which may be processed previously are not included, but the processings are required regardless of the procedure of FIG. 8.

When a target RAN node receives a HANDOVER REQUEST message from a source RAN node in operation 8-100 of FIG. 8, it may be determined whether the message is a HANDOVER REQUEST message transmitted for conditional handover, as in operation 8-200. If the message is a HANDOVER REQUEST message including only information for supporting existing handover, a normal handover preparation procedure may be performed as in operation 8-700. If the message is the HANDOVER REQUEST message for the conditional handover configuration in operation 8-200, the identifier used for the source RAN node to identify the terminal, e.g., source RAN node UEAP ID, may be identified so as to determine whether conditional handover has already been configured for the terminal, as in operation 8-300. In the case of a first HANDOVER REQUEST message for a conditional handover configuration for the terminal, it may be determined whether data forwarding is supported for each DRB or PDU session, and if data forwarding is supported, data forwarding information for reception of forwarded data may be configured, as in operation 8-400. As in operation 8-450, data forwarding information may be included for each DRB or PDU session, which is to be included in a HANDOVER REQUEST ACKNOWLEDGE message to be transmitted to the source RAN node, and related terminal information and data forwarding information are stored. Remaining procedures for conditional handover preparation are performed as in operation 8-600. If there is a case in which conditional handover is configured for the terminal in operation 8-300, configuration is first performed for a HANDOVER REQUEST ACKNOWLEDGE message, which is to be transmitted to the source RAN node, for the terminal, and then transmission may be performed including data forwarding information for each DRB or PDU session, which is the same as information transferred to the source RAN node, or indication information, which indicates that previously transferred data forwarding information is used in the same manner, is included. As in operation 8-600, remaining procedures for conditional handover preparation may be performed.

FIG. 9 shows an example of information additionally required for a signaling message exchanged between a source RAN node and a target RAN node to support the embodiment of FIG. 7. FIG. 9 is an example of information to be additionally included in a previously used HANDOVER REQUEST ACKNOWLEDGE message. If, as shown in FIG. 7, the target RAN node configures, for the same terminal, conditional handover for multiple target cells to the source RAN node, data forwarding information for each DRB or PDU session may be configured and included in a HANDOVER REQUEST ACKNOWLEDGE message for a first response as before, and a HANDOVER REQUEST ACKNOWLEDGE message to be transmitted afterwards may include, instead of the data forwarding information, data forwarding info reused indication information, which indicates that the data forwarding information is used in the same manner, so as to be transmitted as in FIG. 9. The data forwarding info reused indication information may be classified into a UE level or a DRB and PDU session level so as to be included.

Figure 10:
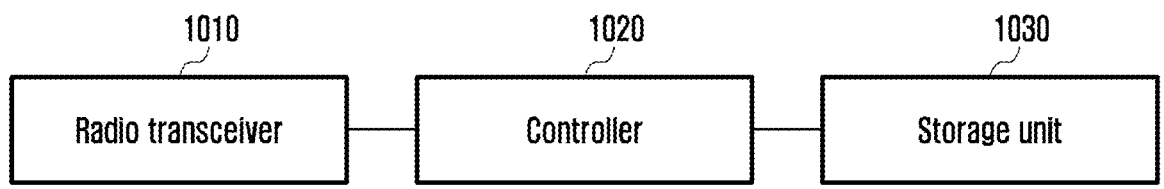
FIG. 10 is a diagram illustrating a structure of a terminal according to an embodiment.

FIG. 10 is a diagram illustrating a structure of a terminal according to an embodiment.

Referring to FIG. 10, a terminal may include a radio transceiver 1010, a controller 1020, and a storage 1030. In the disclosure, the controller may be defined as a circuit, an application-specific integrated circuit, or at least one processor.

The radio transceiver 1010 may transmit a signal to or receive a signal from another network entity. For example, the radio transceiver 1010 may receive a signal from a base station and may transmit a signal including a message, such as a measurement report, to the base station.

The controller 1020 may control overall operations of the terminal according to the embodiment provided in the disclosure. For example, the controller 1020 may control signal flows between respective blocks to perform operations according to the above-described flowchart. Specifically, according to an embodiment, the controller 1020 may control the operations provided in the disclosure so as to enable transmission of a measurement report to a source RAN node, and determination of whether to perform handover according to a configured handover triggering condition, on the basis of a reconfiguration message received from the source RAN node.

The storage 1030 may store at least one of information transmitted or received via the transceiver 1010 and information generated via the controller 1020. For example, the storage 1030 may store information related to a measurement report, information related to handover, and the like.

Figure 11:
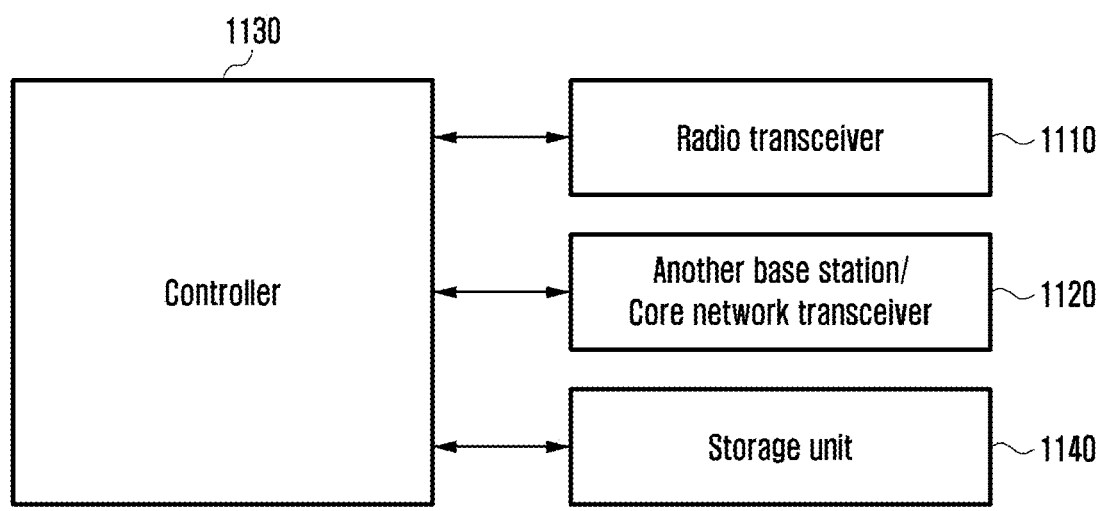
FIG. 11 is a diagram illustrating a structure of a base station according to an embodiment.

FIG. 11 is a diagram illustrating a structure of a base station according to an embodiment.

Referring to FIG. 11, a base station may include a radio transceiver 1110, another base station/core network transceiver 1120, a controller 1130, and a storage 1140. In the disclosure, the controller may be defined as a circuit, an application-specific integrated circuit, or at least one processor.

The base station illustrated in FIG. 11 may be a source RAN node or a target RAN node.

The base station of FIG. 11 may be divided into a centralized unit (CU) and a distributed unit (DU), wherein the CU is further divided into a control plane (CU-CP) and a user plane (CU-UP). One base station may include one or more CU-CPs, one or more CU-UPs, and one or more DUs. The CU-CPs, CU-UPs, and DUs constituting one base station may be configured together. For example, a CU and a DU, in which a CU-CP and a CU-UP are implemented together, may be included in one base station; a CU-CP and a DU may be implemented together while a CU-UP is separately configured, in another base station; another base station may be configured in the form of an integrated base station in which a CU-CP, a CU-UP, and a DU are implemented together; and one base station may be configured by other combinations.

The radio transceiver 1110 may transmit a signal to or receive a signal from another network entity. The transceiver 1110 may transmit a signal to or receive a signal from a terminal, or may transmit a signal including a message, such as RRE reconfiguration for controlling an operation of the terminal.

The other base station/core network transceiver 1120 may transmit a signal to or receive a signal from another network entity. For example, a source RAN node and a target RAN node may transmit and receive a signal including a message, such as a HANDOVER REQUEST message for requesting handover and a HANDOVER REQUEST ACKNOWLEDGE message for responding to a handover request, and the source RAN node and the target RAN node may transmit and receive user data for data forwarding.

The controller 1130 may control overall operations of the base station according to the embodiment provided in the disclosure. For example, the controller 1130 may control signal flows between respective blocks to perform operations according to the above-described flowchart. Specifically, according to an embodiment, when a source RAN node configures conditional handover for multiple target cells of a target RAN node, the controller 1130 may control an operation provided in the disclosure in order to efficiently perform early data forwarding in the target RAN node.

If the base station is divided into a CU and a DU, and the CU is divided into a CU-CP and a CU-UP, the controller 1130 may control a transfer of a message and/or information between the CU-CP, the CU-UP, and the DU.

Specifically, the controller 1130 transfers, from a centralized unit-control plane (CU-CP) to a centralized unit-user plane (CU-UP), a first message for a bearer context modification request during a specific handover procedure, the first message including information on an early forwarding count request, and transfers, from the CU-UP to the CU-CP, a second message for a bearer context modification response, the second message including information on a first downlink (DL) count.

The controller 1130 controls the transceiver to transmit, from the CU-CP to a second base station, a third message including the information on the first DL count.

In this case, the information on the first DL count is transmitted to a CU-CP of the second base station, and the information on the first DL count is transferred using a fourth message for a bearer context modification request from the CU-CP of the second base station to a CU-UP of the second base station.

The controller 1130 determines, using the CU-CP, to request information on a DL discarding, transfers, from the CU-CP to the CU-UP, a fifth message for the bearer context modification request, the fifth message being for requesting the information on the DL discarding, and transfers, from the CU-UP to the CU-CP, a sixth message for the bearer context modification response, the sixth message including the information on the DL discarding.

The controller 1130 controls the transceiver to transmit, from the CU-CP to the CU-CP of the second base station, a seventh message including the information on the DL discarding, wherein the information on the DL discarding is transferred from the CU-CP of the second base station to the CU-UP of the second base station.

In this case, the information on the DL discarding indicates a DL count value of last data successfully transferred to a terminal.

The controller 1130 initiates, using the CU-UP, a procedure for transmitting information on DL discarding, and transfers, from the CU-UP to the CU-CP, an eighth message including the information on the DL discarding, wherein the information on the DL discarding indicates a DL count of last data successfully transferred to a terminal.

Here, a specific handover procedure includes conditional handover (CHO) or dual active protocol stack (DAPS) handover.

The storage 1140 may store at least one of information transmitted or received via the radio transceiver 1110 and the other base station/core network transceiver 1120, and information generated via the controller 1130. For example, the storage 1140 may store information for conditional handover and information for efficiently performing early data forwarding.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a first base station in a wireless communication system, the method comprising:
delivering, from a centralized unit-control plane (CU-CP) to a centralized unit-user plane (CU-UP), a first message for a bearer context modification request during a specific handover procedure, the first message including information on an early forwarding count request;
delivering, from the CU-UP to the CU-CP, a second message for a bearer context modification response, the second message including information on a first downlink (DL) count; and
transmitting, from the CU-CP to a second base station, a third message including the information on the first DL count.

2. The method of claim 1, wherein the information on the first DL count is transmitted to a CU-CP of the second base station, and
wherein the information on the first DL count is delivered, using a fourth message for a bearer context modification request, from the CU-CP of the second base station to a CU-UP of the second base station.

3. The method of claim 1, further comprising:
determining, by the CU-CP, to request information on a DL discarding;
delivering, from the CU-CP to the CU-UP, a fifth message for the bearer context modification request, the fifth message requesting the information on the DL discarding; and
delivering, from the CU-UP to the CU-CP, a sixth message for the bearer context modification response, the sixth message including the information on the DL discarding.

4. The method of claim 3, further comprising:
transmitting, from the CU-CP to the CU-CP of the second base station, a seventh message including the information on the DL discarding,
wherein the information on the DL discarding is delivered, from the CU-CP of the second base station to the CU-UP of the second base station.

5. The method of claim 3, wherein the information on the DL discarding indicates a DL count value of a last data successfully delivered to a terminal.

6. The method of claim 1, further comprising:
initiating, by the CU-UP, a procedure for transmitting information on a DL discarding; and
delivering, from the CU-UP to the CU-CP, an eighth message including the information on the DL discarding,
wherein the information on the DL discarding indicates a DL count of a last data successfully delivered to a terminal.

7. The method of claim 1, wherein the specific handover procedure comprises a conditional handover (CHO) or a dual active protocol stack (DAPS) handover.

8. A first base station in a wireless communication system, the first base station comprising:
a transceiver; and
at least one processor operably connected to the transceiver, the at least one processor configured to:
deliver, from a centralized unit-control plane (CU-CP) to a centralized unit-user plane (CU-UP), a first message for a bearer context modification request during a specific handover procedure, the first message including information on an early forwarding count request,
deliver, from the CU-UP to the CU-CP, a second message for a bearer context modification response, the second message including information on a first downlink (DL) count, and
control the transceiver to transmit, from the CU-CP to a second base station, a third message including the information on the first DL count.

9. The first base station of claim 8, wherein the information on the first DL count is transmitted to a CU-CP of the second base station, and
wherein the information on the first DL count is delivered using a fourth message for a bearer context modification request from the CU-CP of the second base station to a CU-UP of the second base station.

10. The first base station of claim 8, wherein the at least one processor is further configured to:
determine, by the CU-CP, to request information on a DL discarding,
deliver, from the CU-CP to the CU-UP, a fifth message for the bearer context modification request, the fifth message requesting the information on the DL discarding, and
deliver, from the CU-UP to the CU-CP, a sixth message for the bearer context modification response, the sixth message including the information on the DL discarding.

11. The first base station of claim 10, wherein the at least one processor is further configured to:
control the transceiver to transmit, from the CU-CP to the CU-CP of the second base station, a seventh message including the information on the DL discarding, and
wherein the information on the DL discarding is delivered, from the CU-CP of the second base station to the CU-UP of the second base station.

12. The first base station of claim 10, wherein the information on the DL discarding indicates a DL count value of a last data successfully delivered to a terminal.

13. The first base station of claim 8, wherein the at least one processor is further configured to:
initiate, by the CU-UP, a procedure for transmitting information on a DL discarding, and
deliver, from the CU-UP to the CU-CP, an eighth message including the information on the DL discarding, and
wherein the information on the DL discarding indicates a DL count of a last data successfully delivered to a terminal.

14. The first base station of claim 8, wherein the specific handover procedure comprises a conditional handover (CHO) or a dual active protocol stack (DAPS) handover.

* * * * *